United States Patent
Yawata et al.

(10) Patent No.: US 8,324,771 B2
(45) Date of Patent: Dec. 4, 2012

(54) SPINDLE MOTOR AND STORAGE DISK DRIVE APPARATUS

(75) Inventors: Atsushi Yawata, Kyoto (JP); Yasuhiro Suzuki, Kyoto (JP); Shintaro Saeki, Kyoto (JP); Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 149 days.

(21) Appl. No.: 12/849,868

(22) Filed: Aug. 4, 2010

(65) Prior Publication Data

US 2010/0329104 A1 Dec. 30, 2010

Related U.S. Application Data

(63) Continuation-in-part of application No. 12/366,009, filed on Feb. 5, 2009, now Pat. No. 8,120,217.

(30) Foreign Application Priority Data

Feb. 6, 2008 (JP) ................................. 2008-026675

(51) Int. Cl.
*H02K 11/00* (2006.01)
*H02K 5/00* (2006.01)
*H02K 7/00* (2006.01)
*H02K 3/52* (2006.01)

(52) U.S. Cl. .................... 310/71; 310/DIG. 6; 310/67 R; 310/43; 360/99.08; 360/99.23

(58) Field of Classification Search .................... 310/43, 310/71, 89, DIG. 6; 360/98.07; *H02K 15/02, H02K 5/22*

See application file for complete search history.

(56) References Cited

U.S. PATENT DOCUMENTS

| 4,329,606 | A | * | 5/1982 | Montagu | 310/71 |
| 4,594,524 | A | * | 6/1986 | Sudo | 310/68 R |
| 4,668,884 | A | * | 5/1987 | Amao et al. | 310/68 R |
| 5,637,945 | A | * | 6/1997 | Yamamuro et al. | 310/268 |
| 6,118,198 | A | * | 9/2000 | Hollenbeck et al. | 310/89 |
| 6,652,324 | B2 | | 11/2003 | Maiers et al. | |
| 6,771,460 | B2 | * | 8/2004 | Nii et al. | 360/99.08 |
| 7,012,191 | B1 | | 3/2006 | Watanabe et al. | |

(Continued)

FOREIGN PATENT DOCUMENTS

JP 06-074064 U 10/1994

(Continued)

OTHER PUBLICATIONS

Machine translation of JP2001067775, Tamaoka, Mar. 2001.*

(Continued)

*Primary Examiner* — Burton Mullins
*Assistant Examiner* — Terrance Kenerly
(74) *Attorney, Agent, or Firm* — Keating & Bennett, LLP

(57) ABSTRACT

A spindle motor includes a stator unit and a rotor unit supported to be rotatable with respect to the stator unit. The stator unit includes a stator, a base portion including a through hole, and a circuit board. The circuit board includes a connection portion to which a conductive wire from the stator is connected after passing through the through hole, and an extending portion arranged to extend from the connection portion. A lower surface of the base portion includes a recess portion arranged to accommodate the connection portion, and a groove portion arranged to extend from the recess portion to have the extending portion arranged therein. A bottom surface of the groove portion includes a protrusion portion arranged to protrude downwards.

12 Claims, 19 Drawing Sheets

U.S. PATENT DOCUMENTS

| | | | |
|---|---|---|---|
| 7,105,963 | B2 | 9/2006 | Ito et al. |
| 7,144,275 | B2 * | 12/2006 | Iida .............................. 439/587 |
| 7,254,882 | B2 | 8/2007 | Ito et al. |
| 7,684,146 | B1 | 3/2010 | Andrikowich et al. |
| 7,757,378 | B1 | 7/2010 | Mann et al. |
| 8,120,872 | B2 | 2/2012 | Sekii et al. |
| 8,164,851 | B2 | 4/2012 | Yoneda et al. |
| 2005/0206255 | A1 | 9/2005 | Yoshino et al. |
| 2006/0023339 | A1 | 2/2006 | Fukuyama et al. |
| 2006/0281229 | A1* | 12/2006 | Koh et al. .................... 438/127 |
| 2007/0164621 | A1* | 7/2007 | Kano et al. ...................... 310/71 |
| 2008/0012443 | A1 | 1/2008 | Tamaoka et al. |
| 2009/0316299 | A1 | 12/2009 | Tashiro et al. |

FOREIGN PATENT DOCUMENTS

| | | | |
|---|---|---|---|
| JP | 07-222386 A | | 8/1995 |
| JP | 07-334967 A | | 12/1995 |
| JP | 11-218128 A | | 8/1999 |
| JP | 2000-209804 A | | 7/2000 |
| JP | 2001-067775 A | | 3/2001 |
| JP | 3075925 U | | 3/2001 |
| JP | 2001067775 | * | 3/2001 |
| JP | 3373262 B2 | | 2/2003 |
| JP | 3373625 B2 | | 2/2003 |
| JP | 2005-057892 A | | 3/2005 |
| JP | 2005-210787 A | | 8/2005 |
| JP | 2006-040423 A | | 2/2006 |
| JP | 2009-110611 A | | 5/2009 |
| JP | 2009-189157 A | | 8/2009 |
| JP | 2010-009644 A | | 1/2010 |
| JP | 2011-114892 A | | 6/2011 |

OTHER PUBLICATIONS

Yawata et al., "Spindle Motor and Storage Disk Drive Apparatus", U.S. Appl. No. 13/352,442, filed Jan. 18, 2012.

Yawata et al., "Spindle Motor and Storage Disk Drive Apparatus", U.S. Appl. No. 13/352,445, filed Jan. 18, 2012.

Yawata et al.; "Spindle Motor and Storage Disk Drive Apparatus"; U.S. Appl. No. 12/366,009, filed Feb. 5, 2009.

Saichi et al., "Spindle Motor Having Connecting Mechanism Connecting Lead Wire and Circuit Board, and Storage Disk Drive Having the Same", U.S. Appl. No. 13/029,143, filed Feb. 17, 2011.

Sugi et al., "Spindle Motor, Disk Drive Apparatus, and Method of Manufacturing Spindle Motor", U.S. Appl. No. 13/241,773, filed Sep. 23, 2011.

Sugi et al.,"Motor Unit and Disk Drive Apparatus", U.S. Appl. No. 13/290,209, filed Nov. 7, 2011.

Sugi et al.,"Spindle Motor, and Disk Drive Apparatus Including the Spindle Motor", U.S. Appl. No. 13/334,620, filed Dec. 22, 2011.

Matsuyama et al.,"Spindle Motor, Disk Drive Apparatus, and Method of Manufacturing Spindle Motor", U.S. Appl. No. 13/424,632, filed Mar. 20, 2012.

Watanabe, "Method of Manufacturing Motor, Motor, and Disk Drive Apparatus", U.S. Appl. No. 13/437,103, filed Apr. 2, 2012.

Watanabe et al., "Spindle Motor and Disk Drive Apparatus", U.S. Appl. No. 61/625,128, filed Apr. 17, 2012.

Watanabe et al., "Base Unit, Spindle Motor, and Disk Drive Apparatus", U.S. Appl. No. 61/625,132, filed Apr. 17, 2012.

Yawata, "Spindle Motor, Disk Drive Apparatus, and Method of Manufacturing Spindle Motor", U.S. Appl. No. 13/365,286, filed Feb. 3, 2012.

* cited by examiner

A — A

B-B

C-C

D—D

SPINDLE MOTOR AND STORAGE DISK DRIVE APPARATUS

BACKGROUND OF THE INVENTION

1. Field of the Invention

The present invention relates to a spindle motor, and more specifically to a storage disk drive apparatus provided with the spindle motor.

2. Description of the Related Art

Conventionally, a spindle motor for rotating a storage disk is installed within a housing of a storage disk drive apparatus such as a hard disk drive or the like is known. In such a storage disk drive apparatus, a printed circuit board is arranged outside the housing and used for controlling the power supplied to the spindle motor and the operation of the spindle motor. The printed circuit board is electrically connected to the stator of the spindle motor accommodated within the housing. In such a spindle motor, a portion of the printed circuit board is arranged in a recess portion formed on the lower surface of the housing in an effort to reduce the thickness of the spindle motor and the storage disk drive apparatus.

In such an arrangement, conductive wires of the stator are drawn from the recess portion to the lower surface of the housing through a hole formed through the housing. Then the conductive wires are led to the lower surface of the printed circuit board via a through hole of the printed circuit board and are connected to electrodes provided on the lower surface of the printed circuit board.

A flexible printed circuit board is used as the printed circuit board in, e.g., a disk drive apparatus disclosed in Japanese Patent Laid-open Publication No. 2001-67775. The flexible printed circuit board is attached to a housing with a stepped portion to extend along the lower surface of the housing. In this disk drive apparatus, a guide hole, through which a coil line of a stator is drawn, is formed in a bottom wall portion of a bracket of a spindle motor that forms a portion of the housing. A coil line insertion hole communicating with the guide hole is formed at the center of a land portion of the flexible printed circuit board attached to the lower surface of the bracket. The coil line is drawn to the outside through the guide hole and the coil line insertion hole and is soldered to the land portion. At this time, the coil line insertion hole is closed by a solder to seal off the housing, thereby preventing an external air from entering the housing.

In case of the disk drive apparatus disclosed in Japanese Patent Laid-open Publication No. 2001-67775, however, there is a possibility that the sealing reliability may deteriorate due to a time-dependent change of the solder or other causes.

The flexible printed circuit board extends from the recess portion of the housing toward the external region thereof where the flexible printed circuit board is connected to other circuit boards. When sealing the guide hole and the coil line insertion hole with a sealant, there is a need to keep the sealant from flowing out to the external region.

Also, in accordance with an increased reduction in a thickness of the disk drive apparatus, there is a demand for a further reduction in a thickness of a base plate. As mentioned above, a recess portion in which a portion of the flexible printed circuit board is arranged is defined in a lower surface of the base plate. In addition, a variety of recess portions are defined in an upper surface of the base plate to accommodate components of the motor. This, in combination with the reduced thickness of the base plate as a whole, results in some specific areas of the base plate becoming extremely thin. Such extremely thin areas may decrease the rigidity of the base plate so greatly as to induce a vibration in the rest of the motor.

SUMMARY OF THE INVENTION

According to preferred embodiments of the present invention, there is provided a spindle motor used, for example, with a storage disk drive apparatus, the spindle motor including a stator unit and a rotor unit supported to be rotatable about a central axis with respect to the stator unit.

The stator unit includes a stator arranged around the central axis, a base portion, and a circuit board. The base portion is arranged on a lower side of the rotor unit in a direction parallel or substantially parallel to the central axis. The base portion includes a through hole passing therethrough in the direction parallel or substantially parallel to the central axis. The circuit board is attached to a lower surface of the base portion. The circuit board includes a connection portion to which a conductive wire from the stator is connected after passing through the through hole, and a strip-shaped extending portion arranged to extend from the connection portion. The lower surface of the base portion includes a recess portion arranged to accommodate the connection portion, and a groove portion arranged to extend from the recess portion to have the extending portion arranged therein. A bottom surface of the groove portion includes a protrusion portion arranged to protrude downwards.

Thus, spindle motors according to preferred embodiments of the present invention are able to achieve improved rigidity in the base portion.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
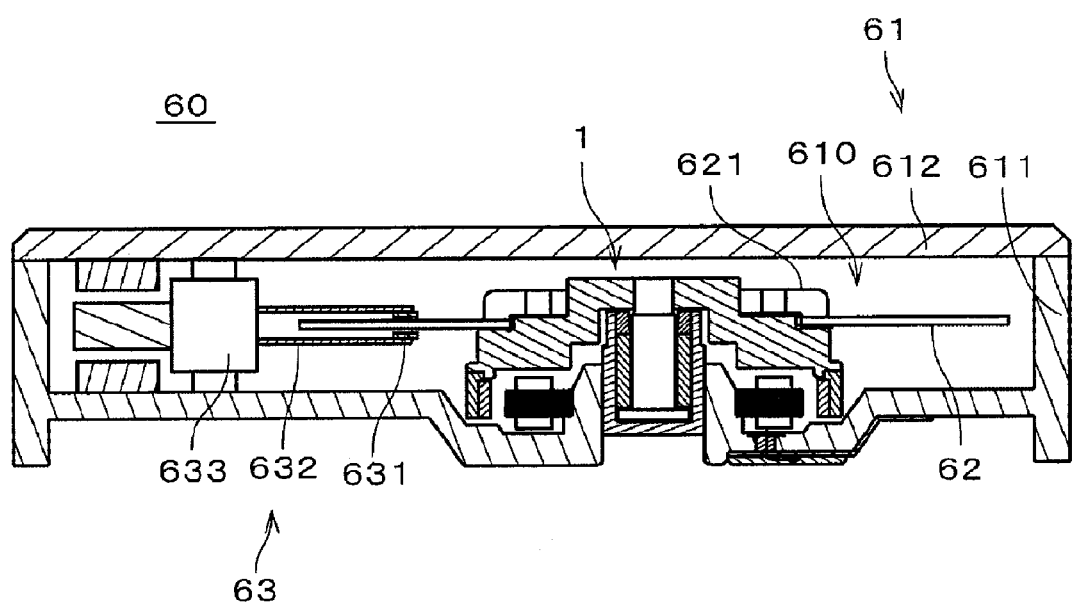
FIG. 1 is a section view showing a storage disk drive apparatus in accordance with a first preferred embodiment of the present invention, which view is taken along a plane containing the central axis of the apparatus.

In the following description, the terms "upper", "lower", "left" and "right" used in explaining the positional relationship and orientation of individual members are intended to designate the positional relationship and orientation in the drawings and not to designate the positional relationship and orientation when built in an actual device.

FIG. 1 is a section view showing the internal construction of a storage disk drive apparatus 60 provided with an electric spindle motor 1 in accordance with a first preferred embodiment of the present invention. The storage disk drive apparatus 60 may be, e.g., a hard disk drive. The storage disk drive apparatus 60 includes a storage disk 62 arranged to store information, an access unit 63 arranged to read and write information from and on the storage disk 62, a spindle motor 1 arranged to hold and rotate the storage disk 62 and a housing 61 arranged to accommodate the storage disk 62, the spindle motor 1 and the access unit 63 within an internal space 610 thereof.

As shown in FIG. 1, the housing 61 preferably includes a first housing member 611 and a second housing member 612. The first housing member 611 has a top portion with an opening and a bottom portion to which the spindle motor 1 and the access unit 63 are fixed. The second housing member 612 defines the internal space 610 by covering the opening of the first housing member 611. In the storage disk drive apparatus 60, the second housing member 612 is bonded to the first housing member 611 to define the housing 61. Dust is extremely rare in the internal space 610 of the housing 61.

The storage disk 62 is mounted on the spindle motor 1 and fixed thereto by a clamp 621, for example. The access unit 63 includes a head 631 arranged to gain access to the storage disk 62 and magnetically perform reading or writing of information, an arm 632 arranged to support the head 631 and a head moving mechanism 633 arranged to move the arm 632 so that the head 631 can be moved with respect to the storage disk 62 and the spindle motor 1. With this construction, the head 631 gains access to a desired position on the storage disk 62 in a state that it remains adjacent to the storage disk 62 under rotation, thus performing the tasks of reading and/or writing information.

Figure 2:
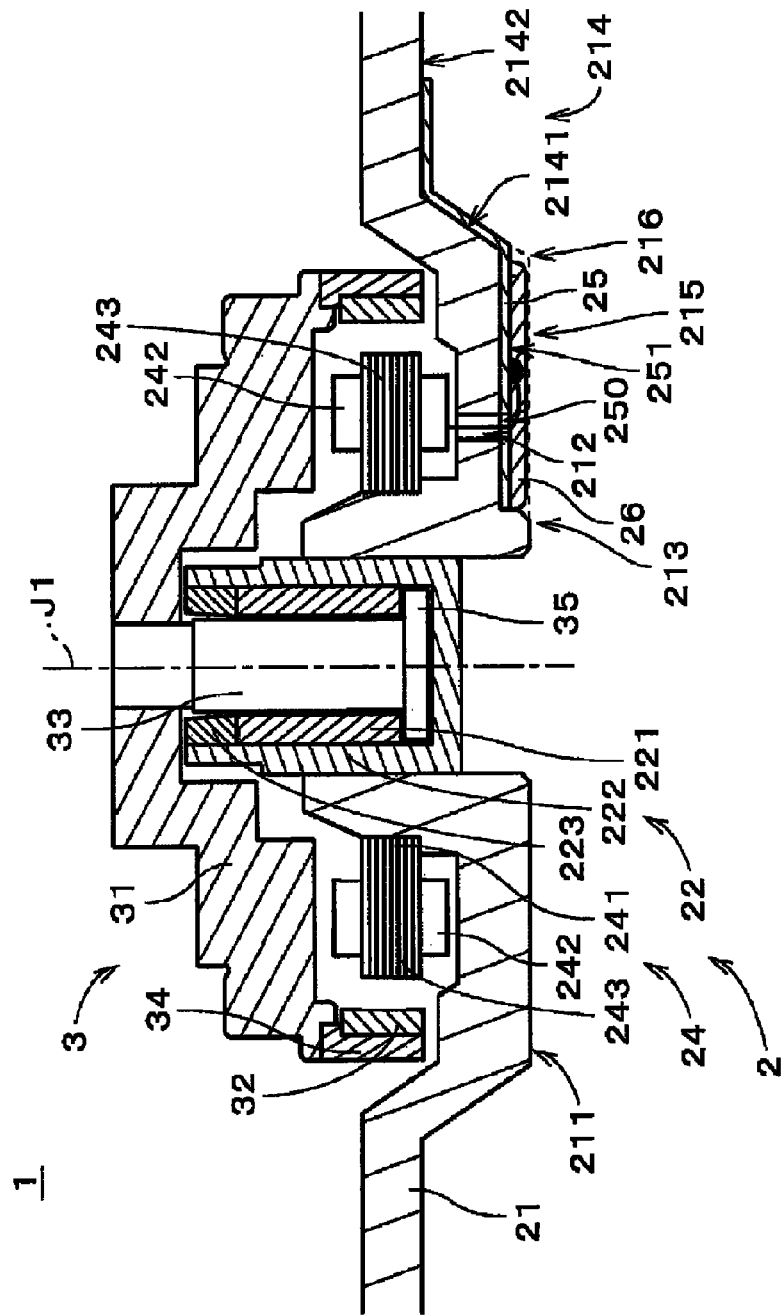
FIG. 2 is a section view showing a spindle motor, which view is taken along a plane containing the central axis of the motor.

FIG. 2 is a section view of the spindle motor 1 used in the storage disk drive apparatus 60 to rotate the storage disk 62, which view is taken along a plane containing a central axis J1. Although FIG. 2 shows the cross section taken along the plane containing the central axis J1 of the spindle motor 1, a portion of the component lying at the rear side of the cross sectional plane is also illustrated by a broken line. The central axis J1 coincides with the central axes of a stator unit 2 and a rotor unit 3.

Referring to FIG. 2, the spindle motor 1 includes the stator unit 2 and the rotor unit 3. The rotor unit 3 is supported by the stator unit 2 to enable rotation about the central axis J1 relative to the stator unit 2 through a bearing mechanism that preferably makes use of a dynamic fluid pressure generated by lubricating oil as a lubricant.

The rotor unit 3 includes a generally disk-shaped rotor hub 31, a generally cylindrical yoke 34, a rotor magnet 32, a shaft 33 and a generally disk-shaped thrust plate 35. The storage disk 62 (see FIG. 1) is mounted to the rotor hub 31. The rotor hub 31 serves to hold individual components of the rotor unit 3 in place. The yoke 34 protrudes downwards form the outer circumferential edge of the rotor hub 31. The rotor magnet 32 is fixed to the inner circumferential surface of the yoke 34 and is arranged around the central axis J1. The shaft 33 has a generally columnar shape concentric with the central axis J1 and protrudes downwards from the rotor hub 31. The thrust plate 35 is fixed to the lower end of the shaft 33. The rotor magnet 32 is magnetized with multiple poles and is adapted to generate a rotational force (torque) acting about the central axis J1 between itself and a stator 24 of the stator unit 2.

The stator unit 2 includes a base plate 21, a sleeve unit 22, the stator 24 and a thin flexible printed circuit board 25. The base plate 21 defines a portion of the first housing member 611 (see FIG. 1) and holds individual components of the stator unit 2 in place. In the present preferred embodiment, the term "base portion" refers to the first housing member 611. The sleeve unit 22 is a portion of the bearing mechanism that rotatably supports the rotor unit 3. In the present preferred embodiment, the term "sleeve portion" refers to the sleeve unit 22. The stator 24 is fixed to the base plate 21 around the sleeve unit 22. The flexible printed circuit board 25 is attached to the lower surface 211 of the base plate 21 and electrically connected to the stator 24. The flexible printed circuit board will be referred to as "FPC" below.

The sleeve unit 22 includes a generally cylindrical sleeve body 221, a generally cylindrical sleeve housing 222 with a bottom portion, and a generally cylindrical seal member 223. The shaft 33 is inserted into the sleeve body 221. The inner circumferential surface of the sleeve body 221 opposes the outer circumferential surface of the shaft 33 through a lubricant. The sleeve housing 222 is fixed to the outer circumferential surface of the sleeve body 221. The seal member 223 is arranged above the sleeve body 221. The sleeve body 221 is preferably made of a porous sintered metal, but could be made from any desirable material. The sleeve housing 222 and the seal member 223 serve to hold the lubricant with which the sleeve body 221 is impregnated. The lower portion of the sleeve unit 22 is press-fitted and fixed to the opening of the base plate 21 arranged at the central region of the latter.

The stator 24 includes a stator core 241 having a plurality of teeth 243 radially arranged about the central axis J1, and a plurality of coils 242 formed by winding conductive wires on the teeth 243, for example. The conductive wires extending from the stator 24 are drawn out of the housing 61 via through holes 212 and 250 respectively defined through the base plate 21 and the FPC 25 in parallel or substantially in parallel to the central axis J1. Then, the conductive wires are bonded, by a solder, to electrodes provided on the lower surface 251 of the FPC 25. The FPC 25 is attached to the lower surface 211 of the base plate 21 by an adhesive agent such as an adhesive or the like, for example. The FPC 25 is partially covered with a resin layer 26. Examples of the adhesive agent include a pressure-sensitive adhesive (PSA).

Figure 3:
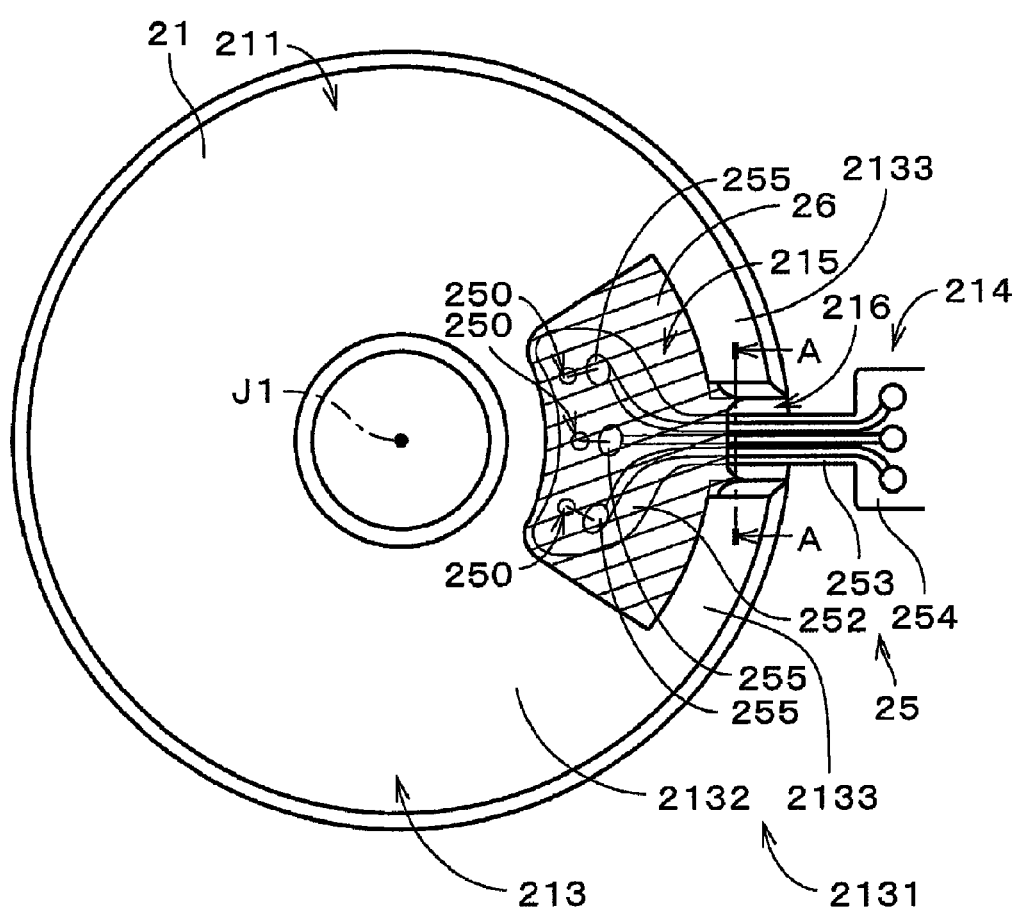
FIG. 3 is an enlarged bottom view showing the portion of a stator unit around the central axis.

FIG. 3 is an enlarged bottom view showing the portion of the stator unit 2 around the central axis J1. In the following description, an annular region 213 of the lower surface 211 of the base plate 21 concentric with the central axis J1 as shown in FIG. 3 will be referred to as a "central region 213". Furthermore, the region existing around the central region 213 of the lower surface 211 of the base plate 21 will be referred to as "peripheral region 214". As shown in FIG. 2, the peripheral region 214 includes an annular slanting area 2141 and a horizontal area 2142 perpendicular or substantially perpendicular to the central axis J1. The slanting area 2141 lies radially outwardly of the central region 213 and continuously extends from the latter. The slanting area 2141 extends gradually upwards as it extends away from the central axis J1. The horizontal area 2142 lies radially outwardly of the slanting area 2141 and continuously extends from the latter.

As can be seen in FIG. 3, a recess portion 215 indented upwards in parallel or substantially in parallel to the central axis J1 is arranged inwardly of the outer circumferential edge of the central region 213. When seen in a plan view, the recess portion 215 has a sector shape concentric with the central axis J1 but having no center-side region. This shape will be referred to as a sector shape herein below. The periphery of the recess portion 215 is surrounded by a raised portion 2131 for most of its circumference. The borders between the radial inner and outer ends of the recess portion 215 and the raised portion 2131 are defined into a generally arc-like shape concentric with the central axis J1. A groove portion 216 extending radially outwardly from the recess portion 215 and interconnecting the recess portion 215 and the peripheral region 214 is arranged in the region of the raised portion 2131 lying radially outwardly of the recess portion 215. The groove portion 216 and the recess portion 215 communicate with each other.

As shown in FIG. 2, the bottom surface of the groove portion 216 is substantially flush in an axial direction with the bottom surface of the recess portion 215. The slanting area 2141 and the horizontal area 2142 of the peripheral region 214 are positioned higher than the groove portion 216. Referring to FIG. 3, the width of the groove portion 216 (namely, the width in a direction perpendicular or substantially perpendicular to the radial direction) is smaller than the width of the recess portion 215 and remains substantially constant in the radial direction. Although not shown in FIG. 3, the opposite side surfaces of the groove portion 216 are preferably chamfered near the boundary between the recess portion 215 and the groove portion 216 and near the boundary between the groove portion 216 and the peripheral region 214. The width of the groove portion 216 near the boundaries is therefore a little greater than the width of the groove portion 216 in the radial intermediate extension of the latter.

The raised portion 2131 has the shape of an annulus concentric with the central axis J1, a portion of which is removed along the circumferential direction (a so-called "partially annular shape"). This shape will be referred to as a partially annular shape herein below.

The raised portion 2131 includes a partially annular portion 2132 and two generally arc-like arm portions 2133. The partially annular portion 2132 surrounds the radial inner side and the circumferential opposite sides of the sector-shaped recess portion 215. The arm portions 2133 protrude from the partially annular portion 2132 along the radial outer side of the recess portion 215 and surround the radial outer side of the recess portion 215 except the portion of radial outer side connected to the groove portion 216. In the central region 213, the raised portion 2131 is arranged into an arc-like shape to surround the recess portion 215 at the circumferential opposite sides of the latter. The arm portions 2133 prevent a flowable resin material from flowing out to the peripheral region 214 when the flowable resin material is applied on the recess portion 215 as will be set forth later. The arm portions 2133 serve as a dam portion.

As described above, the lower surface 211 of the base plate 21 positioned below the rotor unit 3 includes the central region 213, the peripheral region 214, the recess portion 215 and the groove portion 216. When seen in a plan view, the central region 213 overlaps with the stator 24. The peripheral region 214 is arranged around the central region 213 and positioned higher than the central region 213. The recess portion 215 is arranged within the central region 213. The groove portion 216 interconnects the recess portion 215 and the peripheral region 214.

As shown in FIG. 3, the FPC 25 includes a connection portion 252, an external terminal portion 254 and a strip-shaped extending portion 253. The connection portion 252 has electrodes 255 to which the conductive wires extending from the stator 24 are connected. The external terminal portion 254 is provided with terminals arranged to connect with external devices, the terminals being used to connect the FPC 25 to other circuit boards (e.g., a circuit board arranged to drive and control the spindle motor 1). The wiring lines extend from the electrodes 255 of the connection portion 252 to the terminals of the external terminal portion 254 along the extending portion 253. In the stator unit 2, as shown in FIGS. 2 and 3, the connection portion 252 of the FPC 25 is accommodated within the recess portion 215 of the lower surface 211 of the base plate 21, and the external terminal portion 254 is arranged in the slanting area 2141 and the horizontal area 2142 of the peripheral region 214. The extending portion 253 extending from the connection portion 252 of the FPC 25 to the peripheral region 214 is arranged within the groove portion 216.

Figure 4:
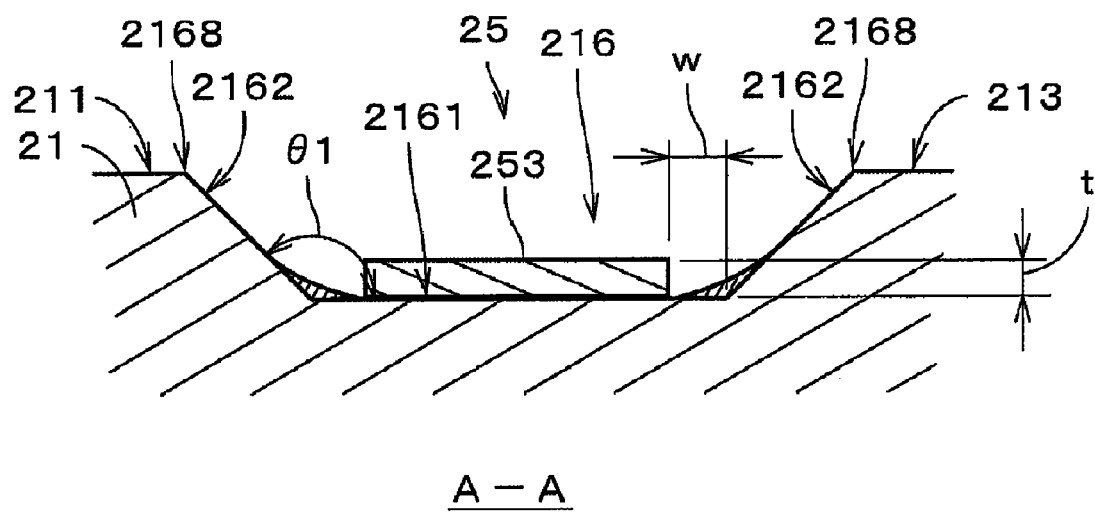
FIG. 4 is a partial section view showing a base plate, which view is taken along line A-A in FIG. 3.

FIG. 4 is a section view of the base plate 21 taken along line A-A in FIG. 3. In FIG. 4, the base plate 21 is depicted in a vertically inverted state so that the lower surface 211 of the base plate 21 can be positioned at the upper side in the figure (this also holds true in FIGS. 5A, 5B, 10, 12 and 13). Referring to FIG. 4, the bottom surface 2161 of the groove portion 216 in which the extending portion 253 of the FPC 25 is arranged is positioned higher, in the direction of the central axis J1, than the area of the central region 213 excluding the recess portion 215 (see FIG. 3) and the groove portion 216. The bottom surface 2161 of the groove portion 216 is one of the surfaces of the groove portion 216 positioned at the upper side. In FIG. 4, the bottom surface 2161 is depicted as if it is positioned at the lower side of the groove portion 216. The opposite side surfaces 2162 of the groove portion 216 are inclined in a manner such that they gradually slope downwards as they go away from the bottom surface 2161 in the circumferential direction. The opposite side surfaces 2162 refer to the surfaces that extend from respective lateral sides of the bottom surface 2161 to the corresponding lower edges 2168 of the groove portion 216 in the circumferential direction about the central axis J1. The angle θ1 between the bottom surface 2161 and the opposite side surfaces 2162 of the groove portion 216 is in a range of from approximately 95° to approximately 175°.

In the groove portion 216, the extending portion 253 of the FPC 25 attached to the bottom surface 2161 of the groove portion 216 is spaced apart from the opposite side surfaces 2162 of the groove portion 216. It is preferred that the distance w between the extending portion 253 and each of the opposite side surfaces 2162 of the groove portion 216 is about 1.5 to about 5 times as great as the thickness t of the extending portion 253. The distance w denotes the shortest distance between the lateral surface of the extending portion 253 and the corresponding side surface 2162 of the groove portion 216 opposed to the lateral surface. In the example shown in FIG. 4, the distance w refers to the distance leading from the border between the side surface 2162 and the bottom surface 2161 of the groove portion 216 to the border between the lateral surface of the extending portion 253 and the bottom surface 2161 of the groove portion 216.

In the spindle motor 1, it is preferred that the distance w is from about 0.15 mm to about 1.5 mm and the thickness t is from about 0.1 mm to about 0.3 mm. It is also preferred that the width of the extending portion 253 of the FPC 25 is from about 1.5 mm to about 3.5 mm, the depth of the groove portion 216 being from about 0.3 mm to about 0.9 mm and the length of the groove portion 216 being from about 1.7 mm to about 5.0 mm. Moreover, it is preferred that the diameter of the central region 213 is from about 15 mm to about 30 mm. In the present preferred embodiment, the distance w is about 0.3 mm and the thickness t is about 0.18 mm. Furthermore, the width of the extending portion 253 of the FPC 25 is about 2.54 mm, the depth of the groove portion 216 being about 0.6 mm, the length of the groove portion 216 being about 3.0 mm and the diameter of the central region 213 being about 22 mm.

As indicated by hatching lines in FIG. 3, the connection portion 252 of the FPC 25 arranged within the recess portion 215 of the base plate 21 is covered in its entirety with a resin layer 26. As set forth earlier, the FPC 25 is attached to the lower surface 211 of the base plate 21 by an adhesive agent. Consequently, the connection portion 252 of the FPC 25 is fixed in place within the recess portion 215 by the adhesive agent existing between the connection portion 252 and the bottom surface of the recess portion 215 and also by the resin layer 26. The through holes 212 pierced in the base plate 21 and the through holes 250 formed in the FPC 25 are blocked by the adhesive agent and the resin layer 26, thereby hermetically sealing the internal space 610 of the housing 61.

When forming the resin layer 26, the base plate 21 is held in a vertically inverted state so that the recess portion 215 can be opened upwards along the direction of gravity. In other words, the base plate 21 is held to ensure that the axial lower side of the spindle motor 1 faces upwards along the direction of gravity. A resin material with flowability is applied on the recess portion 215 in a state that the connection portion 252 of the FPC 25 is accommodated within the recess portion 215. The resin material with flowability will be referred to as a flowable resin material herein below. Then, the flowable resin material is cured to form the resin layer 26. In the present preferred embodiment, use is made of, e.g., a thermally curable adhesive agent as the flowable resin material. The resin layer 26 that covers the connection portion 252 of the FPC 25 is formed by applying the thermally curable adhesive agent on the recess portion 215 and then heating the same.

In the spindle motor 1, the height of the resin layer 26 is set smaller than the depth of the recess portion 215 as can be noted in FIG. 2. This prevents the resin layer 26 from protruding downwards beyond the area of the central region 213 excluding the recess portion 215 and the groove portion 216. As a consequence, it becomes possible to reduce the thickness of the spindle motor 1 and the storage disk drive apparatus 60.

During the process of forming the resin layer 26, the viscosity of the thermally curable adhesive agent is first decreased by heating before the adhesive agent is subjected to curing. Thus the thermally curable adhesive agent flows into the groove portion 216 under the action of a capillary force generated in the groove portion 216. In particular, the thermally curable adhesive agent flows into the groove portion 216 under the action of a capillary force generated in the space surrounded by the opposite side surfaces 2162 and the bottom surface 2161 of the groove portion 216 and the lateral surfaces 2531 of the extending portion 253 of the FPC 25. In the present preferred embodiment, the viscosity of the thermally curable adhesive agent is from about 0.5 Pa·s to about 13 Pa·s when the adhesive agent is in the lowest viscous state. As illustrated in FIG. 3, the leading end of the thermally curable adhesive agent flowing into the groove portion 216 is stopped near the middle of the groove portion 216 before it reaches the boundary between the groove portion 216 and the peripheral region 214. As the thermally curable adhesive agent is cured to form the resin layer 26, a portion of the extending portion 253 of the FPC 25 (namely, the portion of the extending portion 253 adjacent to the connection portion 252) is covered with the resin layer 26 in the groove portion 216 and fixed in place within the groove portion 216. This improves the bonding force between the FPC 25 and the base plate 21 and prevents the FPC 25 from being separated from the base plate 21.

Now, it is assumed that there exists a spindle motor in which the opposite side surfaces of the groove portion of the base plate are perpendicular or substantially perpendicular to the bottom surface of the groove portion, with the width of the groove portion being substantially constant in the radial direction. Below, such a spindle motor will be referred to as a comparative spindle motor. In case of the comparative spindle motor, a strong capillary force is generated in the groove portion. Therefore, there is a possibility that a large quantity of thermally curable adhesive agent will flow into the groove portion and then overflow toward the peripheral region during the course of forming the resin layer. If the thermally curable adhesive agent flowing out of the groove portion flows down along the slanting area of the peripheral region positioned nearer to the rotor unit than is the central region and eventually reaches the external terminal portion of the FPC arranged in the horizontal area, the terminals arranged for connection with external devices may possibly be covered with the adhesive agent, thus leading to a connection defect.

In the spindle motor 1 of the first preferred embodiment, however, the opposite side surfaces 2162 gradually sloping downwards in the direction of the central axis J1 as they go away from the bottom surface 2161 in the circumferential direction are arranged at the circumferentially opposite sides of the bottom surface 2161 of the groove portion 216. This construction helps suppress the generation of a capillary force in the groove portion 216. As a result, it is possible to prevent the thermally curable adhesive agent from flowing out to the peripheral region 214 through the groove portion 216 when the adhesive agent is applied on the recess portion 215 defined on the lower surface 211 of the base plate 21 of the spindle motor 1.

In the groove portion 216, the angle θ1 between the bottom surface 2161 and each of the opposite side surfaces 2162 is set equal to or greater than approximately 95°. This construction makes it possible to more reliably suppress that generation of a capillary force in the groove portion 216 than when the angle θ1 is smaller than approximately 95°. Furthermore, the thermally curable adhesive agent is more reliably prevented from flowing out to the peripheral region 214 through the groove portion 216. Further, the angle θ1 between the bottom surface 2161 and each of the opposite side surfaces 2162 is set equal to or smaller than approximately 175°. This construction helps prevent the maximum width of the groove portion 216 from becoming unnecessarily greater. The term "maximum width" refers to the width between the opposite side surfaces 2162 of the groove portion 216 at the opposite side from the bottom surface 2161. As a result, it is possible to prevent the extending portion 253 of the FPC 25 accommodated in the groove portion 216 from making contact with external objects and eventually suffering from damage.

In the spindle motor 1, the distance w between the extending portion 253 of the FPC 25 and the opposite side surfaces 2162 of the groove portion 216 is set at least about 1.5 times greater than the thickness t of the extending portion 253. This construction helps suppress generation of a capillary force in between the extending portion 253 and the opposite side surfaces 2162 of the groove portion 216. This makes it possible to prevent the thermally curable adhesive agent from flowing out to the peripheral region 214 through between the extending portion 253 and the opposite side surfaces 2162 of the groove portion 216. The distance w between the extending portion 253 of the FPC 25 and the opposite side surfaces 2162 of the groove portion 216 is set at most about 5 times greater than the thickness t of the extending portion 253. This construction prevents the maximum width of the groove portion 216 from unnecessarily becoming greater. As a result, it is possible to more reliably prevent the extending portion 253 from making contact with external objects and eventually suffering from damage during the process of fabricating the storage disk drive apparatus 60 or other situations.

As described above, it is possible in the spindle motor 1 to prevent the thermally curable adhesive agent from flowing into the peripheral region 214 through the groove portion 216 when the adhesive agent is applied on the recess portion 215 of the base plate 21. For the very reason, the peripheral region 214 is positioned higher than the groove portion 216 in the spindle motor 1. This construction is particularly suitable for use in a spindle motor having a structure in which a thermally curable adhesive agent is likely to spread over a peripheral region when it flows out of a groove portion.

In the groove portion 216, it is preferred that the opposite side surfaces 2162 slope downwards as they go away from the bottom surface 2161. However, the present invention is not limited thereto. For example, depending on the shape of the FPC 25 or the position and the shape of the application region of the thermally curable adhesive agent, one of the opposite side surfaces 2162 may slope downwards as it extends away from the bottom surface 2161 and the other may be generally perpendicular to the bottom surface 2161. Also in this case, it is possible to suppress generation of a capillary force in the groove portion 216 and also to prevent the thermally curable adhesive agent from flowing out to the peripheral region 214 through the groove portion 216. The capillary force generated in the groove portion 216 refers to the capillary force that would otherwise be generated in the space surrounded by the bottom surface 2161 and one inclined side surface 2162 of the groove portion 216 and one lateral surface 2531 of the extending portion 253 of the FPC 25.

Figure 5A:
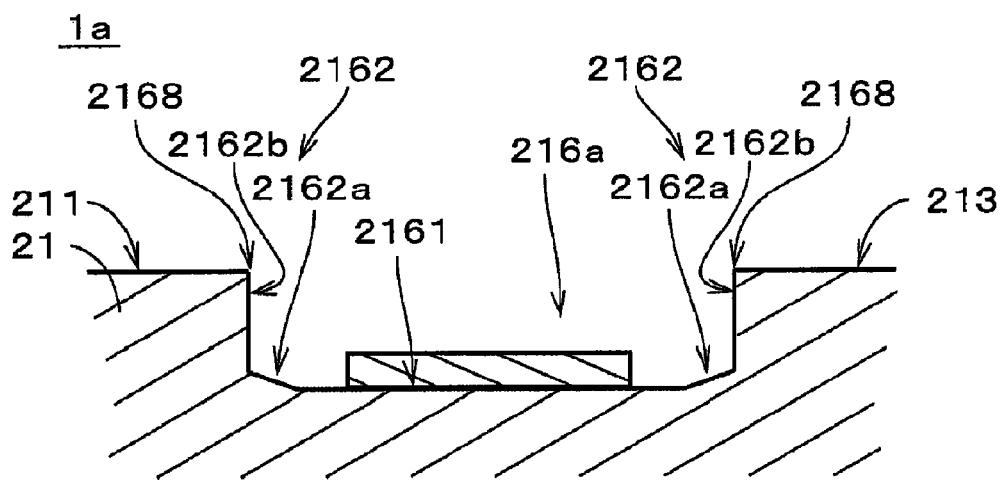
FIG. 5A is a partial section view showing a modified example of the base portion of the spindle motor.

Next, description will be made on a spindle motor in accordance with a modified example of the first preferred embodiment of the present invention. FIG. 5A is a partial section view showing the base plate 21 of a spindle motor 1a in accordance with a modified example of the first preferred embodiment. FIG. 5A corresponds to FIG. 4 showing the spindle motor 1 in accordance with the first preferred embodiment. Referring to FIG. 5A, a groove portion 216a differing in shape from the groove portion 216 shown in FIGS. 3 and 4 is defined on the lower surface 211 of the base plate 21 in the spindle motor 1a. Other structures remain the same as the structures of the spindle motor 1 shown in FIGS. 2 and 3. In the following description, the equivalent components will be designated by like reference numerals.

As shown in FIG. 5A, the groove portion 216a that interconnects the recess portion 215 of the central region 213 and the peripheral region 214 (see FIGS. 2 and 3) is defined on the lower surface 211 of the base plate 21. Each of the opposite side surfaces 2162 of the groove portion 216a is provided with a slant surface 2162a and a side wall 2162b. The slant surface 2162a is defined by a planar surface gradually sloping downwards as it extends away from the bottom surface 2161 in the circumferential direction about the central axis J1. The side wall 2162b is defined by a planar surface extending from the lower portion of the slant surface 2162a to the lower edge 2168 of the groove portion 216. The angle between the slant surface 2162a and the bottom surface 2161 of the groove portion 216a is from approximately 95° to approximately 175°. The side wall 2162b is perpendicular or substantially perpendicular to the bottom surface 2161.

In the spindle motor 1a of the modified example of the first preferred embodiment described above, the slant surface 2162a gradually sloping downwards as it extends away from the bottom surface 2161 in the circumferential direction is defined at each of the circumferentially opposite sides of the bottom surface 2161 of the groove portion 216a. As is the case in the first preferred embodiment, this construction helps suppress the generation of a capillary force in the groove portion 216a. Consequently, it is possible to prevent the thermally curable adhesive agent from flowing out into the peripheral region 214 through the groove portion 216a.

Alternatively, the side wall 2162b of the groove portion 216a may be defined by a surface inclined with respect to the bottom surface 2161. It is preferred that the slant surface 2162a is arranged at the opposite sides of the bottom surface 2161 in the groove portion 216a. However, the slant surface 2162a may be arranged at only one circumferential side of the bottom surface 2161 between the bottom surface 2161 and the side wall 2162b. The bottom surface 2161 and the side wall 2162b may be directly connected to each other at the other circumferential side of the bottom surface 2161. Also in this case, it is possible to suppress generation of a capillary force at the side of the groove portion 216 where the slant surface 2162a is arranged. This makes it possible to prevent the thermally curable adhesive agent from flowing out to the peripheral region 214 through the groove portion 216a.

Figure 5B:
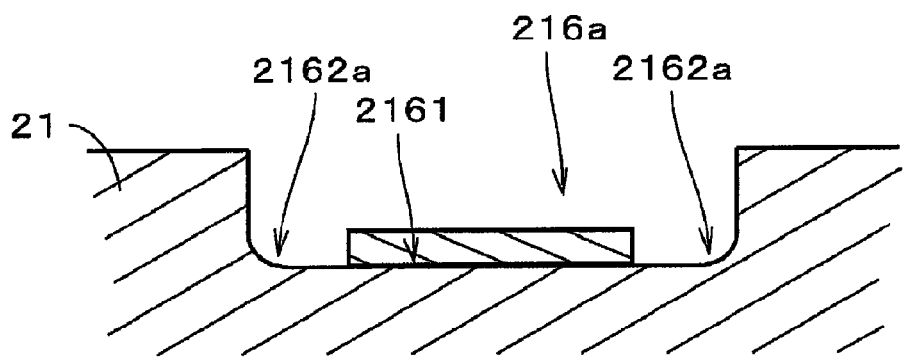
FIG. 5B is a partial section view showing a modified example of a groove portion.

FIG. 5B is a partial section view of the base plate 21 illustrating a modified example of the groove portion 216a. As shown in FIG. 5B, the opposite slant surfaces 2162a of the groove portion 216a arranged at the opposite sides of the bottom surface 2161 may include curved surfaces bulging upwards in the direction of the central axis J1 (namely, downwards in FIG. 5B).

Figure 6:
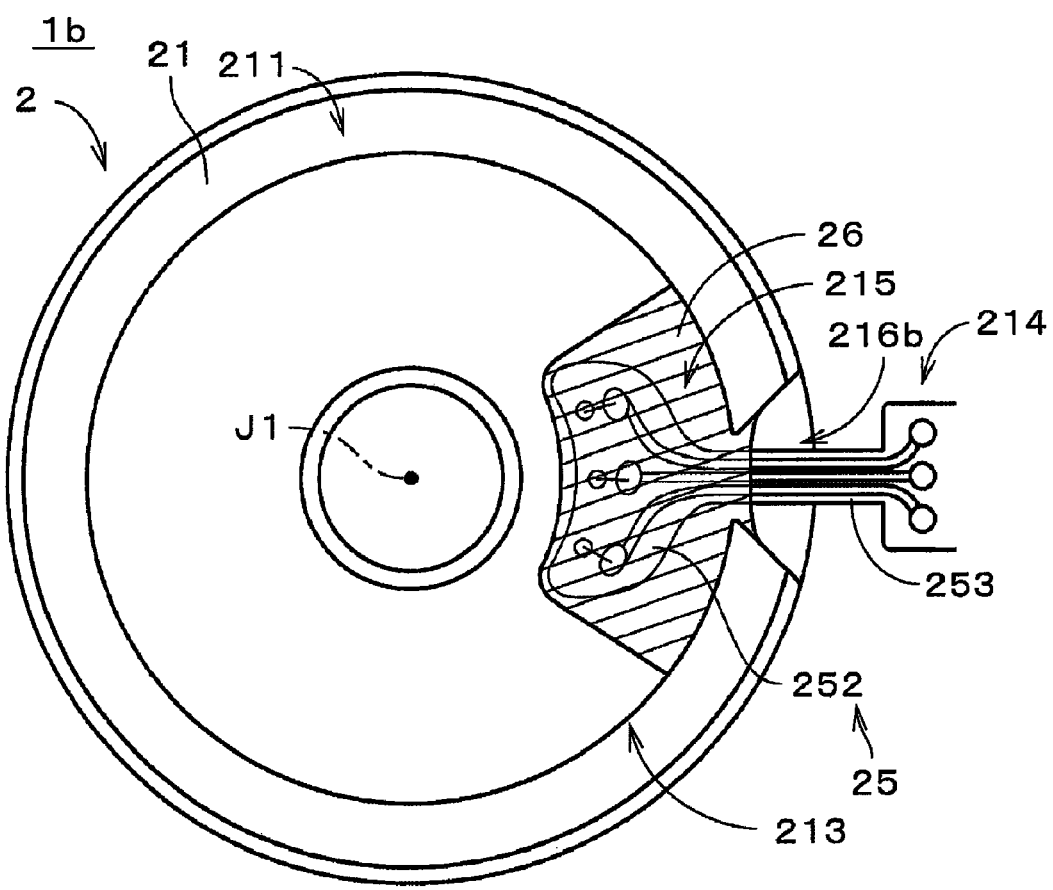
FIG. 6 is an enlarged bottom view showing the portion around the central axis in a spindle motor in accordance with a second preferred embodiment of the present invention.

Next, description will be made on a spindle motor in accordance with a second preferred embodiment of the present invention. FIG. 6 is an enlarged bottom view showing the portion of the stator unit 2 around the central axis J1 in a spindle motor 1b of the second preferred embodiment. As shown in FIG. 6, a groove portion 216b different in shape than the groove portion 216 shown in FIG. 3 is defined on the lower surface 211 of the base plate 21 in the spindle motor 1b. Other structures remain the same as the structures of the spindle motor 1 shown in FIGS. 2 and 3. In the following description, the equivalent components will be designated by like reference numerals.

Figure 7:
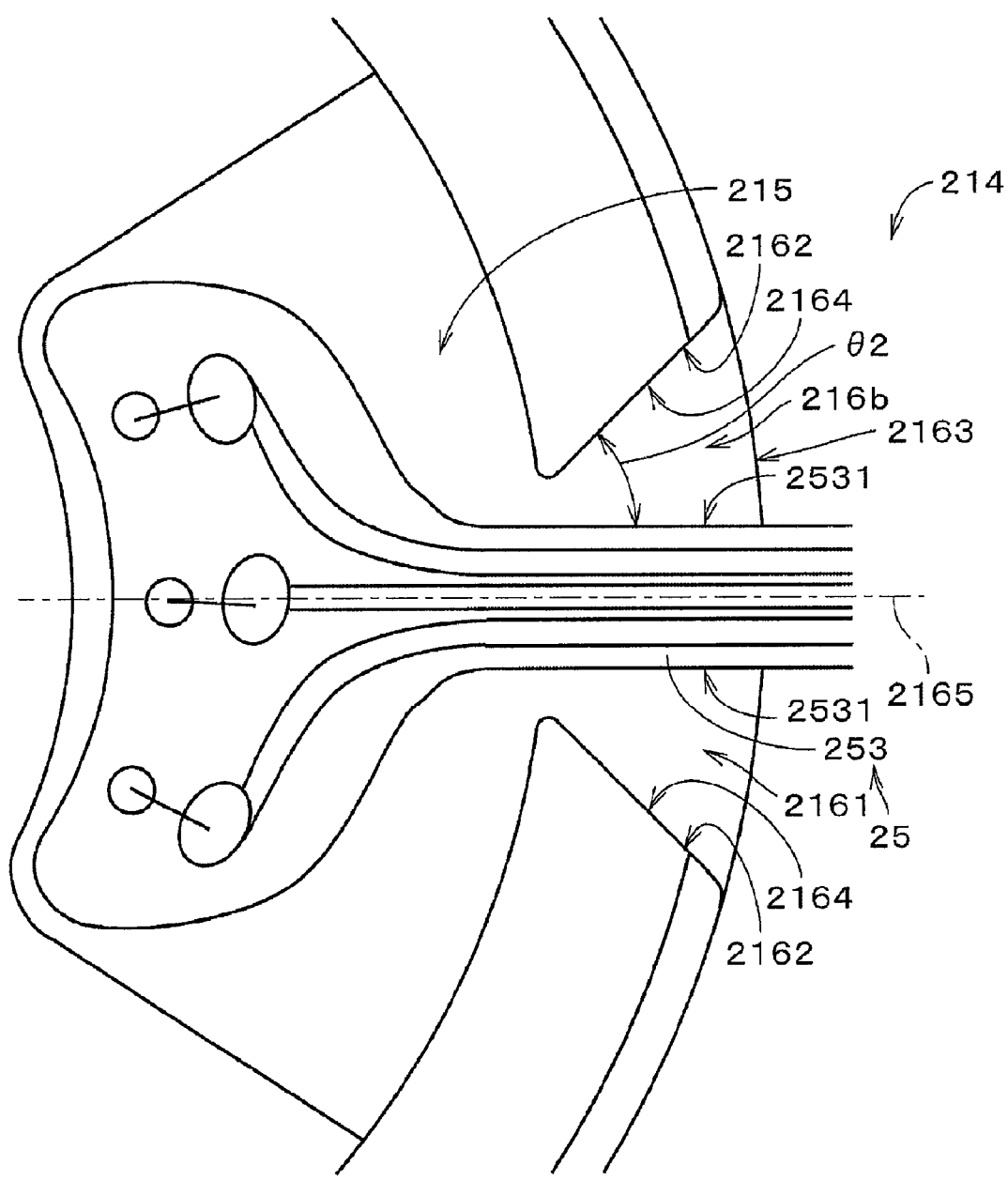
FIG. 7 is an enlarged bottom view showing a recess portion and its neighborhood.

FIG. 7 is a enlarged bottom view showing the recess portion 215 and its surroundings in the spindle motor 1b. For the purpose of furthering easier understanding, the resin layer 26 is omitted from FIGS. 7, 8A, 8B, 9, and 11. As shown in FIG. 7, a groove portion 216b is defined on the lower surface 211 of the base plate 21 to interconnect the recess portion 215 of the central region 213 and the peripheral region 214. Each of the opposite side surfaces 2162 of the groove portion 216b is generally perpendicular to the lower surface 2161 of the groove portion 216b. The width of the groove portion 216b is gradually decreased toward the central axis J1 over substantially the full radial length of the groove portion 216b. In this regard, the width of the groove portion 216b refers to the distance between the opposite side surfaces 2162 in a direction perpendicular or substantially perpendicular to the radial direction. In other words, the distance between the opposite side surfaces 2162 of the groove portion 216b is gradually reduced over substantially the entire length of the groove portion 216b from the radial outer end portion to the radial inner end portion. The term "full length" denotes the total length of the groove portion 216b excluding the chamfered regions of the radial inner and outer end portions.

The opposite side surfaces 2162 of the groove portion 216b are preferably finely chamfered near the boundary between the recess portion 215 and the groove portion 216b and near the boundary 2163 between the groove portion 216b and the peripheral region 214. The portions of the opposite side surfaces 2162 other than the portions near the afore-mentioned two boundaries, i.e., the portions of the opposite side surfaces 2162 lying between the chamfered regions near the two boundaries, extend generally rectilinearly when seen in a plan view. In the following description, the portions of the opposite side surfaces 2162 extending generally rectilinearly when seen in a plan view will be referred to as "planar portions 2164".

Within the groove portion 216b, the opposite lateral surfaces 2531 of the extending portion 253 of the FPC 25 are formed to extend generally parallel to the center line 2165 of the groove portion 216b. The center line 2165 refers to an imaginary line extending radially from the central axis J1 to pass through the middle point of the width of the groove portion 216b. When seen in a plan view, the angle θ2 between the planar portion 2164 of each side surface 2162 of the groove portion 216b and the corresponding lateral surface 2531 of the extending portion 253 opposed to the side surface 2162 is preferably equal to or greater than approximately 10° and smaller than approximately 90°, and more preferably from approximately 10° to approximately 80°. In the present preferred embodiment, the angle θ2 is set equal to approximately 45°.

Referring to FIG. 6, the connection portion 252 of the FPC 25 is accommodated within the recess portion 215 of the base plate 21 as is the case in the first preferred embodiment. The connection portion 252 is attached to the base plate 21 by an adhesive agent existing between itself and the bottom surface of the recess portion 215. A thermally curable adhesive agent is applied on the recess portion 215 and is cured to form a resin layer 26 that covers the connection portion 252 of the FPC 25 in its entirety.

In the course of forming the resin layer 26, the thermally curable adhesive agent is allowed to flow into the groove portion 216b from the recess portion 215 and is cured in a state that it has arrived near the center of the groove portion 216b. As a result, a portion of the extending portion 253 of the FPC 25 (namely, the portion of the extending portion 253 adjacent to the connection portion 252) is covered with the resin layer 26 and fixed in place within the groove portion 216b. This arrangement improves the bonding force between the FPC 25 and the base plate 21 and prevents the FPC 25 from being separated from the base plate 21.

In the spindle motor 1b of the second preferred embodiment, the distance between the opposite side surfaces 2162 of the groove portion 216b when seen in a plan view is gradually decreased over substantially the entire length of the groove portion 216b from the radial outer end portion to the radial inner end portion. Therefore, a surface tension acts on the thermally curable adhesive agent in between the opposite side surfaces 2162 of the groove portion 216b and the opposite lateral surfaces 2531 of the extending portion 253. Consequently, it is possible to prevent the thermally curable adhesive agent from flowing out to the peripheral region 214 through the groove portion 216b when the adhesive agent is applied on the recess portion 215 defined on the lower surface 211 of the base plate 21 of the spindle motor 1b.

When seen in a plan view, the angle θ2 between the planar portion 2164 of each side surface 2162 of the groove portion 216b and the corresponding lateral surface 2531 of the extending portion 253 is set equal to or greater than approximately 10°. This makes it possible to sufficiently increase the width of the groove portion 216b toward the peripheral region 214, thereby further suppressing generation of a capillary force in the groove portion 216b. Furthermore, the angle θ2 is set smaller than approximately 90° (and preferably equal to or smaller than approximately 80°). This prevents the width of the groove portion 216b from becoming unnecessarily larger. As a result, it is possible to more reliably prevent the extending portion 253 of the FPC 25 accommodated in the groove portion 216b from making contact with external objects and eventually suffering from damage.

Figure 8A:
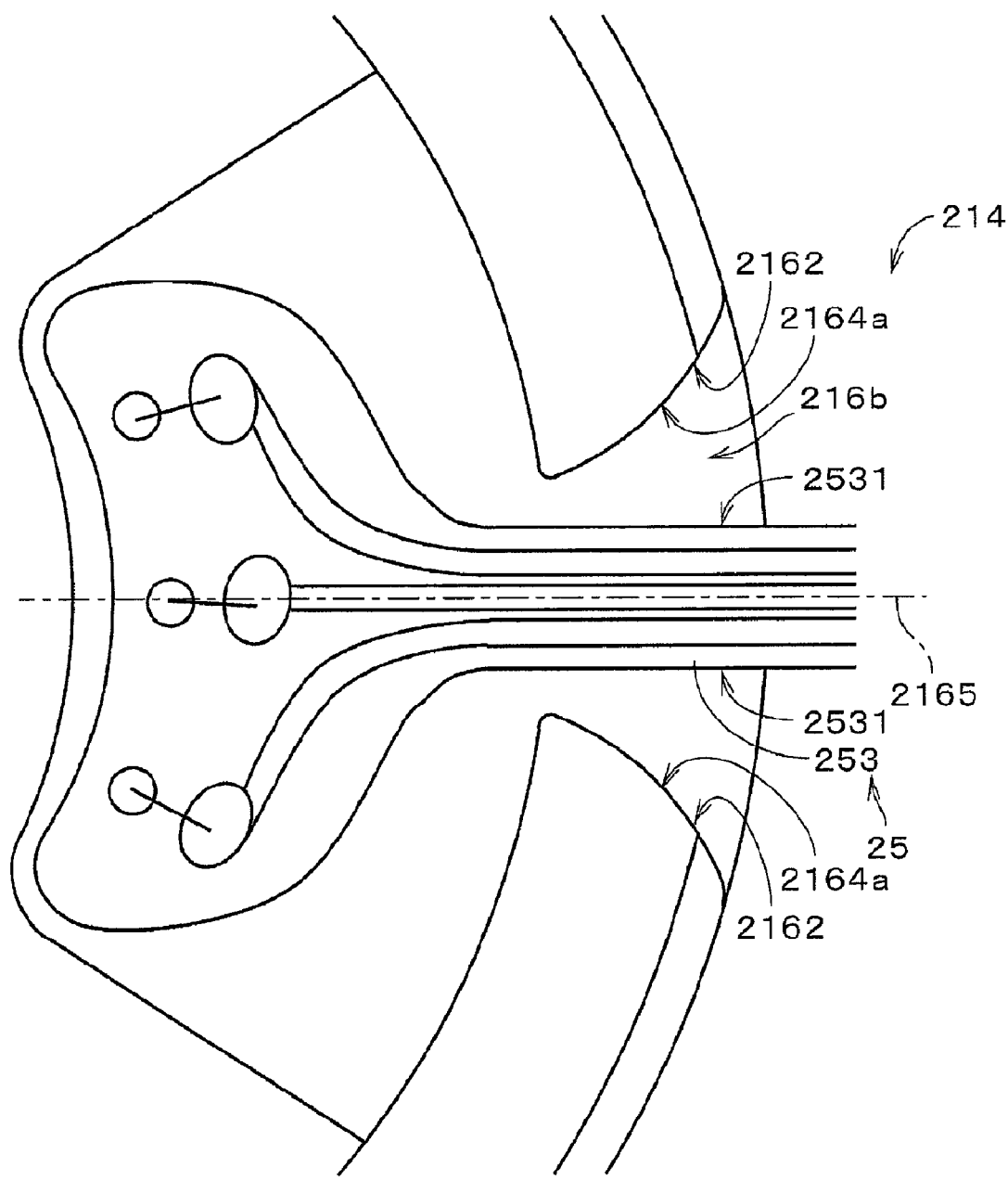
FIG. 8A is an enlarged bottom view showing a recess portion and its neighborhood.

Referring to FIG. 8A, instead of the planar portion 2164, a curved surface portion 2164a having a curvilinear shape bulging toward the center line 2165 of the groove portion 216b when seen in a plan view may be arranged in each of the opposite side surfaces 2162 of the groove portion 216b. In this case, the distance between the opposite side surfaces 2162 of the groove portion 216b is gradually decreased over substantially the entire length of the groove portion 216b from the radial outer end portion to the radial inner end portion. This makes it possible to prevent the thermally curable adhesive agent from flowing out to the peripheral region 214 through the groove portion 216b.

When the curved surface portion 2164a is arranged in each of the opposite side surfaces 2162 of the groove portion 216b as set forth above, the plan-view average angle between the curved surface portion 2164a of each of the opposite side surfaces 2162 and the corresponding lateral surface 2531 of the extending portion 253 is set equal to or greater than approximately 10° in the respective side surfaces 2161 of the groove portion 216b. With this arrangement, the thermally curable adhesive agent is more reliably prevented from flowing out to the peripheral region 214. The term "average angle" refers to the radial average of the varying angles between the curved surface portion 2164a and each of the opposite lateral surfaces 2531 of the extending portion 253. Furthermore, the average angle is set smaller than approximately 90° (and preferably less than or equal to approximately 80°). By doing so, the extending portion 253 of the FPC 25 accommodated within the groove portion 216b can be reliably protected from damage.

Figure 8B:
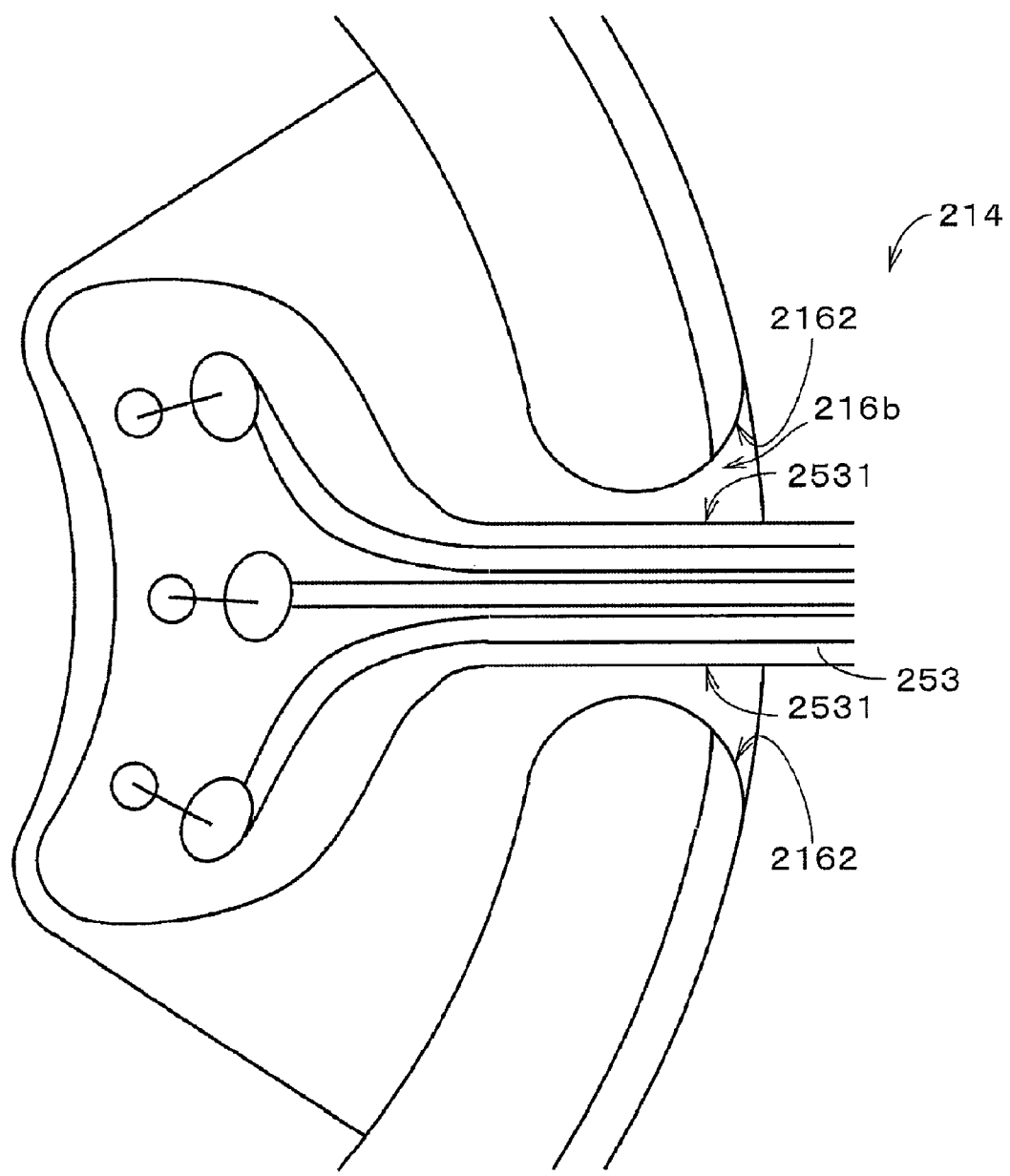
FIG. 8B is an enlarged bottom view showing a recess portion and its neighborhood.

In the spindle motor 1b of the second preferred embodiment, it is not always necessary that the distance between the opposite side surfaces 2162 of the groove portion 216b is gradually decreased over substantially the entire length of the groove portion 216b from the outer end portion to the inner end portion. It may be sufficient if the distance is gradually decreased over a specified extent from the outer end portion toward the inner end portion. The specified extent may refer to, e.g., a range of about 1 mm or more extending from the boundary 2163 between the groove portion 216b and the peripheral region 214 toward the recess portion 215. For example, as illustrated in FIG. 8B, the opposite side surfaces 2162 of the groove portion 216 may have a semicircular shape bulging toward each of the opposite lateral surfaces 2531 of the extending portion 253 when seen in a plan view. Also with this configuration, it is possible to prevent the thermally curable adhesive agent from flowing out to the peripheral region 214.

Figure 9:
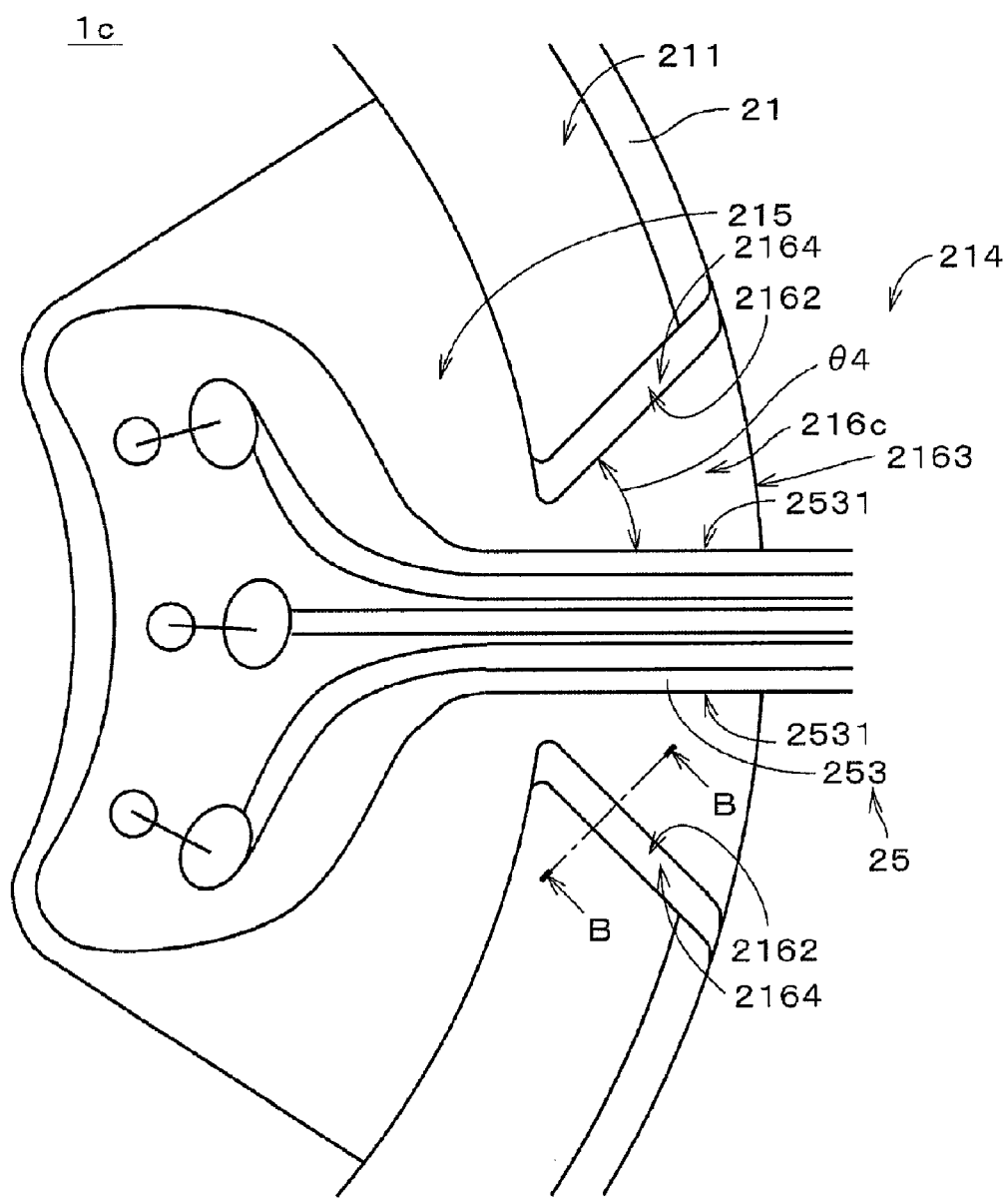
FIG. 9 is an enlarged bottom view showing a recess portion and its neighborhood in a modified example of the spindle motor.

Next, description will be made on a spindle motor in accordance with a modified example of the first preferred embodiment of the present invention. FIG. 9 is an enlarged bottom view showing the recess portion 215 and its neighborhood formed on the lower surface 211 of the base plate 21 of a spindle motor 1c in accordance with a modified example of the first preferred embodiment. In the spindle motor 1c shown in FIG. 9, a groove portion 216c differing in shape from the groove portion 216 illustrated in FIG. 3 is defined on the lower surface 211 of the base plate 21. Other structures remain the same as the structures of the spindle motor 1 shown in FIGS. 2 and 3. In the following description, the equivalent components will be designated by like reference numerals.

In the spindle motor 1c shown in FIG. 9, the plan-view distance between the opposite side surfaces 2162 of the groove portion 216c is gradually decreased over substantially the entire length of the groove portion 216c from the radial outer end portion to the radial inner end portion. The opposite side surfaces 2162 of the groove portion 216c are preferably finely chamfered near the boundary between the recess portion 215 and the groove portion 216c and near the boundary 2163 between the groove portion 216c and the peripheral region 214.

The portions of the opposite side surfaces 2162 other than the portions near the afore-mentioned two boundaries, i.e., the portions of the opposite side surfaces 2162 lying between the chamfered regions near the two boundaries, will be referred to as "planar portions 2164".

Figure 10:
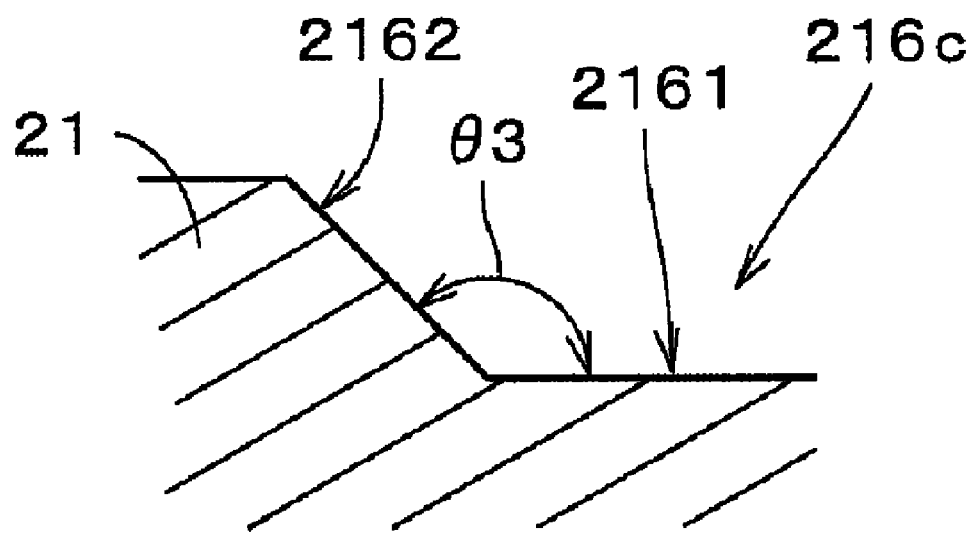
FIG. 10 is a partial section view showing a base plate, which view is taken along line B-B in FIG. 9.

FIG. 10 is a partial section view of the base plate 21 taken along line B-B in FIG. 9. The cross sectional plane shown in FIG. 10 is perpendicular or substantially perpendicular to the planar portion 2164 (see FIG. 9) of one side surface 2162 of the groove portion 216c. As shown in FIG. 10, the side surface 2162 of the groove portion 216c is inclined downwards (namely, toward the upper side in FIG. 10) as it extends away from the bottom surface 2161 in the circumferential direction. In the cross sectional plane perpendicular or substantially perpendicular to the planar portion 2164 of one side surface 2162, the angle θ3 between the bottom surface 2161 and the side surface 2162 of the groove portion 216c is from approximately 95° to approximately 175° as is the case in the first preferred embodiment. Just like the first preferred embodiment, this prevents the thermally curable adhesive agent applied on the recess portion 215 shown in FIG. 9 from flowing out to the peripheral region 214 through the groove portion 216c. Furthermore, it is possible to prevent the extending portion 253 of the FPC 25 accommodated in the groove portion 216c from making contact with external objects and eventually suffering from damage.

In the groove portion 216c, the distance between the opposite side surfaces 2162 is gradually decreased over substantially the entire length of the groove portion 216c from the radial outer end portion to the radial inner end portion. This makes it possible to reliably prevent the thermally curable adhesive agent from flowing out to the peripheral region 214 through the groove portion 216c.

The plan-view angle θ4 between the planar portion 2164 of each of the opposite side surfaces 2162 of the groove portion 216c and the corresponding lateral surface 2531 of the extending portion 253 is from approximately 10° to less than approximately 90° (and preferably from approximately 10° to approximately 80°). This construction more reliably prevents the thermally curable adhesive agent from flowing out to the peripheral region 214. Furthermore, it is possible to more reliably prevent the extending portion 253 of the FPC 25 from making contact with external objects and eventually suffering from damage.

In the spindle motor 1c, each of the opposite side surfaces 2162 of the groove portion 216c may be provided with, instead of the planar portion 2164, a curved surface portion bulging toward the extending portion 253. In this case, the distance between the opposite side surfaces 2162 of the groove portion 216c is gradually decreased over substantially the entire length of the groove portion 216c from the radial outer end portion to the radial inner end portion. This construction makes it possible to more reliably prevent the thermally curable adhesive agent from flowing out to the peripheral region 214 through the groove portion 216c. The plan-view average angle between the curved surface portion of each of the opposite side surfaces 2162 of the groove portion 216c and the corresponding lateral surface 2531 of the extending portion 253 is from approximately 10° to less than approximately 90° (and preferably from approximately 10° to approximately 80°). With this construction, it is possible to more reliably prevent the thermally curable adhesive agent from flowing out to the peripheral region 214 and also to more reliably protect the extending portion 253 of the FPC 25 from damage.

In the spindle motor 1c, it is not always necessary that the distance between the opposite side surfaces 2162 of the groove portion 216c is gradually decreased over substantially the entire length of the groove portion 216c from the outer end portion to the inner end portion. For example, it may be sufficient if the distance is gradually decreased over a specified distance from the outer end portion toward the inner end portion. This configuration makes it possible to prevent the thermally curable adhesive agent from flowing out to the peripheral region 214. The specified distance may refer to, e.g., a range of about 1 mm or more extending from the boundary 2163 between the groove portion 216c and the peripheral region 214 toward the recess portion 215.

Figure 11:
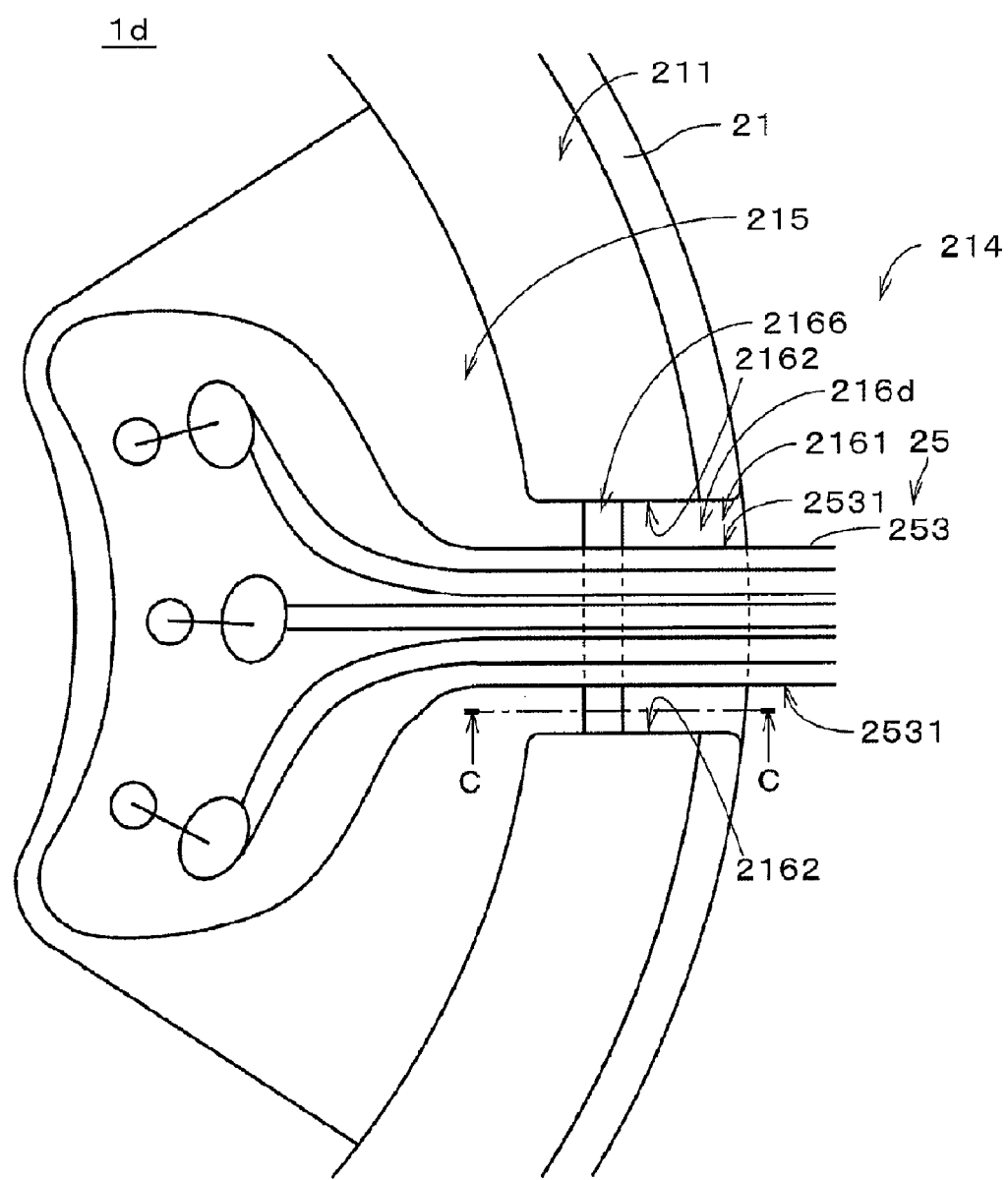
FIG. 11 is an enlarged bottom view showing a recess portion and its neighborhood in another modified example of the spindle motor.

Next, description will be made on a spindle motor in accordance with another modified example of the first preferred embodiment of the present invention. FIG. 11 is an enlarged bottom view showing the recess portion 215 and its neighborhood formed on the lower surface 211 of the base plate 21 of a spindle motor 1d in accordance with another modified example of the first preferred embodiment. In the spindle motor 1d shown in FIG. 11, a groove portion 216d differing in shape from the groove portion 216 illustrated in FIG. 3 is defined on the lower surface 211 of the base plate 21. Other structures remain the same as the structures of the spindle motor 1 shown in FIGS. 2 and 3. In the following description, the equivalent components will be designated by like reference numerals.

As shown in FIG. 11, the width of the groove portion 216d, i.e., the width of the groove portion 216d in a direction perpendicular or substantially perpendicular to the radial direction, is substantially constant along the radial direction. Each of the opposite side surfaces 2162 of the groove portion 216d is perpendicular or substantially perpendicular to the bottom surface 2161 of the groove portion 216d.

Figure 12:
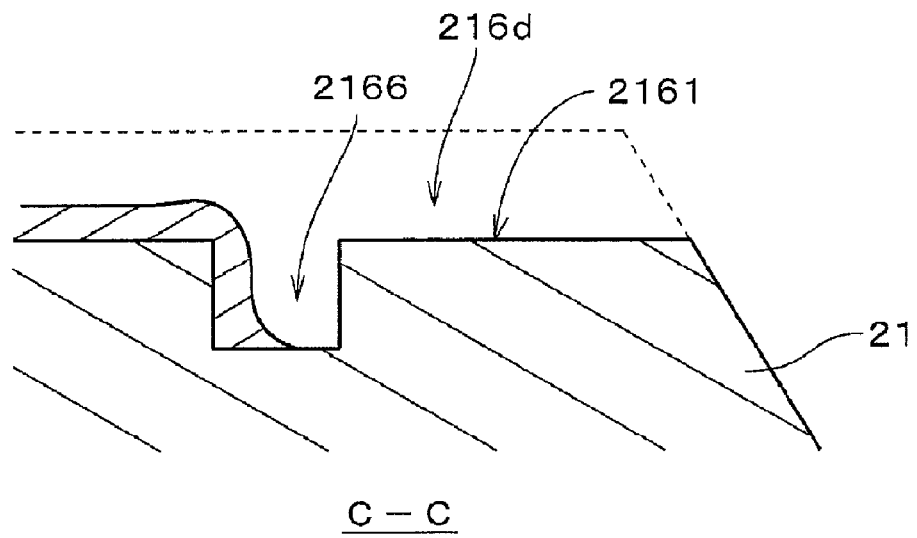
FIG. 12 is a partial section view showing a base plate, which view is taken along line C-C in FIG. 11.

FIG. 12 is a partial section view of the base plate 21 taken along line C-C in FIG. 11. For the purpose of facilitating easier understanding, a portion of the component lying behind the cross-sectional plane is illustrated with a broken line (this also holds true in FIG. 13). In the spindle motor 1*d* shown in FIGS. 11 and 12, the bottom surface 2161 of the groove portion 216*d* has a trench portion 2166 indented upward from the bottom surface 2161. The upper side from the bottom surface 2161 denotes the side at which the rotor unit 3 lies, i.e., the lower side in FIG. 12. With this construction, the thermally curable adhesive agent (the hatched portion in FIG. 12) flowing into the groove portion 216*d* from the recess portion 215 is stopped in the trench portion 2166 during the course of applying the adhesive agent on the recess portion 215. As a result, it is possible to prevent the thermally curable adhesive agent from flowing out to the peripheral region 214 through the groove portion 216*d*.

As can be seen in FIG. 11, the trench portion 2166 extends continuously from one of the opposite side surfaces 2162 of the groove portion 216*d* to the other. This ensures that the thermally curable adhesive agent flowing into the groove portion 216*d* is stopped in the trench portion 2166. Consequently, it is possible to more reliably prevent the thermally curable adhesive agent from flowing out to the peripheral region 214 through the groove portion 216*d*.

Figure 13:
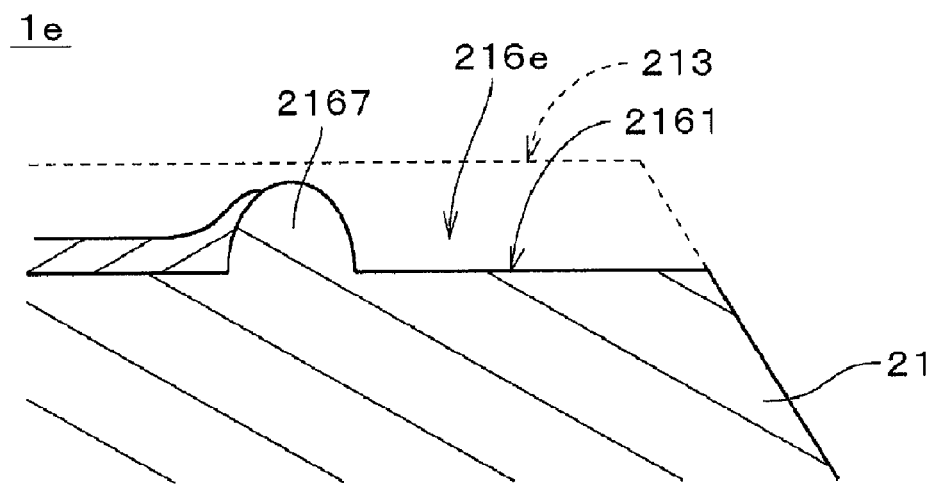
FIG. 13 is a partial section view showing a base plate in a further modified example of the spindle motor.

Next, description will be made on a spindle motor in accordance with a further modified example of the first preferred embodiment of the present invention. FIG. 13 is a section view showing a portion of the base plate 21 of a spindle motor 1*e* in accordance with a further modified example of the first preferred embodiment, which view corresponds to FIG. 12. In the spindle motor 1*e* shown in FIG. 13, the bottom surface 2161 of the groove portion 216*e* is provided with a protrusion portion 2167 protruding downwards, i.e., upwards in FIG. 13 away from the rotor unit 3. Other structures remain the same as the structures of the spindle motor 1*d* shown in FIG. 11. In the following description, the equivalent components will be designated by like reference numerals.

In the spindle motor 1*e*, the thermally curable adhesive agent (hatched in FIG. 13) flowing into the groove portion 216*e* from the recess portion 215 is dammed by the protrusion portion 2167 during the process of applying the thermally curable adhesive agent on the recess portion 215. This prevents the adhesive agent from flowing out to the peripheral region 214 through the groove portion 216*e*. As can be seen in FIG. 13, the protrusion portion 2167 has a height smaller than that of the central region 213 when measured from the bottom surface 2161 of the groove portion 216*e*. The tip end of the protrusion portion 2167 does not protrude downwards in the direction of the central axis J1 (namely, upwards in FIG. 13) beyond the central region 213.

Similarly, the extending portion 253 of the FPC 25 making contact with the tip end of the protrusion portion 2167 does not protrude downwards beyond the central region 213. This assists in avoiding an increase in the thickness of the spindle motor 1*e*.

In the groove portion 216*e*, the protrusion portion 2167 extends continuously from one of the opposite side surfaces 2162 of the groove portion 216*e* to the other (see FIG. 11). This makes it possible for the protrusion portion 2167 to more reliably dam up the thermally curable adhesive agent flowing into the groove portion 216*e*. As a result, it is possible to more reliably prevent the adhesive agent from flowing out to the peripheral region 214 through the groove portion 216*e*.

It is not always necessary that the trench portion 2166 shown in FIGS. 11 and 12 extends continuously from one of the opposite side surfaces 2162 of the groove portion 216*d* to the other. It may be sufficient if the trench portion 2166 is formed in the regions between the opposite side surfaces 2162 of the groove portion 216*d* and the opposite lateral surfaces 2531 of the extending portion 253 of the FPC 25. This makes it possible to prevent the adhesive agent from flowing out to the peripheral region 214 through the groove portion 216*d*. The regions between the opposite side surfaces 2162 of the groove portion 216*d* and the opposite lateral surfaces 2531 of the extending portion 253 of the FPC 25 refer to the two regions on the bottom surface 2161 of the groove portion 216*d* between the opposite side surfaces 2162 and the opposite lateral surfaces 2531 that oppose each other.

Furthermore, it is not always necessary that the protrusion portion 2167 shown in FIG. 13 extend continuously from one of the opposite side surfaces 2162 of the groove portion 216*e* (see FIG. 11) to the other. For example, it may be sufficient if the protrusion portion 2167 is defined in the regions between the opposite side surfaces 2162 of the groove portion 216*e* and the opposite lateral surfaces 2531 of the extending portion 253 of the FPC 25. This makes it possible to prevent the adhesive agent from flowing out to the peripheral region 214 through the groove portion 216*e*.

While certain preferred embodiments of the present invention and their modified examples have been described hereinabove, the present invention is not limited thereto but may be modified in many different ways.

The task of fixing the connection portion 252 of the FPC 25 within the recess portion 215 may be realized, e.g., only by the resin layer 26 that covers the entirety of the connection portion 252. In this case, the through holes 212 and 250 pierced through the base plate 21 and the FPC 25 are blocked by the resin layer 26, thus hermetically sealing the internal space 610 of the housing 61. Alternatively, the connection portion 252 may be fixed within the recess portion 215 only or mainly through the adhesive agent existing between the connection portion 252 and the bottom surface of the recess portion 215. In this case, the resin layer 26 that covers the connection portion 252 is arranged at least in the region extending from the electrodes 255, at which the connection portion 252 is connected to the stator 24, to the boundary between the recess portion 215 and the groove portion of the base plate 21. The internal space 610 of the housing 61 is hermetically sealed by this construction.

In the spindle motors described above, the resin layer 26 may be formed by applying, e.g., an ultraviolet-curable adhesive agent as the flowable resin material on the recess portion 215. In this case, the viscosity of the ultraviolet-curable adhesive agent is first reduced by the irradiation of ultraviolet rays, after which the adhesive agent is cured. In the spindle motors described above, however, it is possible to prevent the ultraviolet-curable adhesive agent from flowing out to the peripheral region 214 through the groove portion. The structures of the spindle motors that can prevent outflow of the flowable resin material in this way are particularly useful in case where the thermally curable adhesive agent or the ultraviolet-curable adhesive agent whose viscosity is first reduced prior to its curing is applied on the recess portion 215. In the spindle motors described above, the thermally curable adhesive agent and the ultraviolet-curable adhesive agent may be used in combination. Alternatively, other resin materials may also be used in place of the thermally curable adhesive agent and the ultraviolet-curable adhesive agent.

In the spindle motors described above, a rigid printed circuit board instead of the FPC 25 may be attached to the lower surface 211 of the base plate 21. In this case, the task of fixing the rigid printed circuit board to the base plate 21 may be performed, e.g., by fitting juts of the rigid printed circuit board to attachment holes of the base plate 21 without having to apply an adhesive agent to between the lower surface 211 of the base plate 21 and the rigid printed circuit board. The printed circuit board mentioned herein includes a so-called circuit board that incorporates wiring lines, chips and the like arranged on a board.

It is not always necessary that the peripheral region 214 defined on the lower surface 211 of the base plate 21 lies higher than the groove portion in the direction of the central axis J1. For example, it may be sufficient if the peripheral region 214 lies higher than the central region 213, i.e., the lowermost surface region of the lower surface 211 of the base plate 21 in which the recess portion 215 is defined. The peripheral region 214 may be, e.g., a horizontal surface flush with the bottom surface 2161 of the groove portion.

In the spindle motors of the foregoing preferred embodiments, it is not always necessary that the base portion arranged to hold the respective portions of the stator unit 2 in place is defined of the base plate 21 which is a portion of the first housing member 611. For example, the base portion may be a bracket produced independently of and attached to the first housing member 611 to form a portion of the housing 61.

Furthermore, it is not always necessary that the spindle motors are of an outer rotor type in which the rotor magnet 32 is arranged outside the stator 24. The spindle motors may be an inner rotor type in which the rotor magnet 32 is arranged inside the stator 24.

The spindle motors described above are suitable for use in a storage disk drive apparatus incorporating an access unit that performs one or both of the tasks of reading and writing information with respect to a storage disk, i.e., a reading task and/or a writing task. The storage disk drive apparatus 60 provided with the spindle motors can be used as an apparatus for driving other disk-shaped storage media such as an optical disk, a magneto-optical disk and the like, as well as the magnetic disk. The spindle motors may be used in various devices other than the storage disk drive apparatus.

Figure 14:
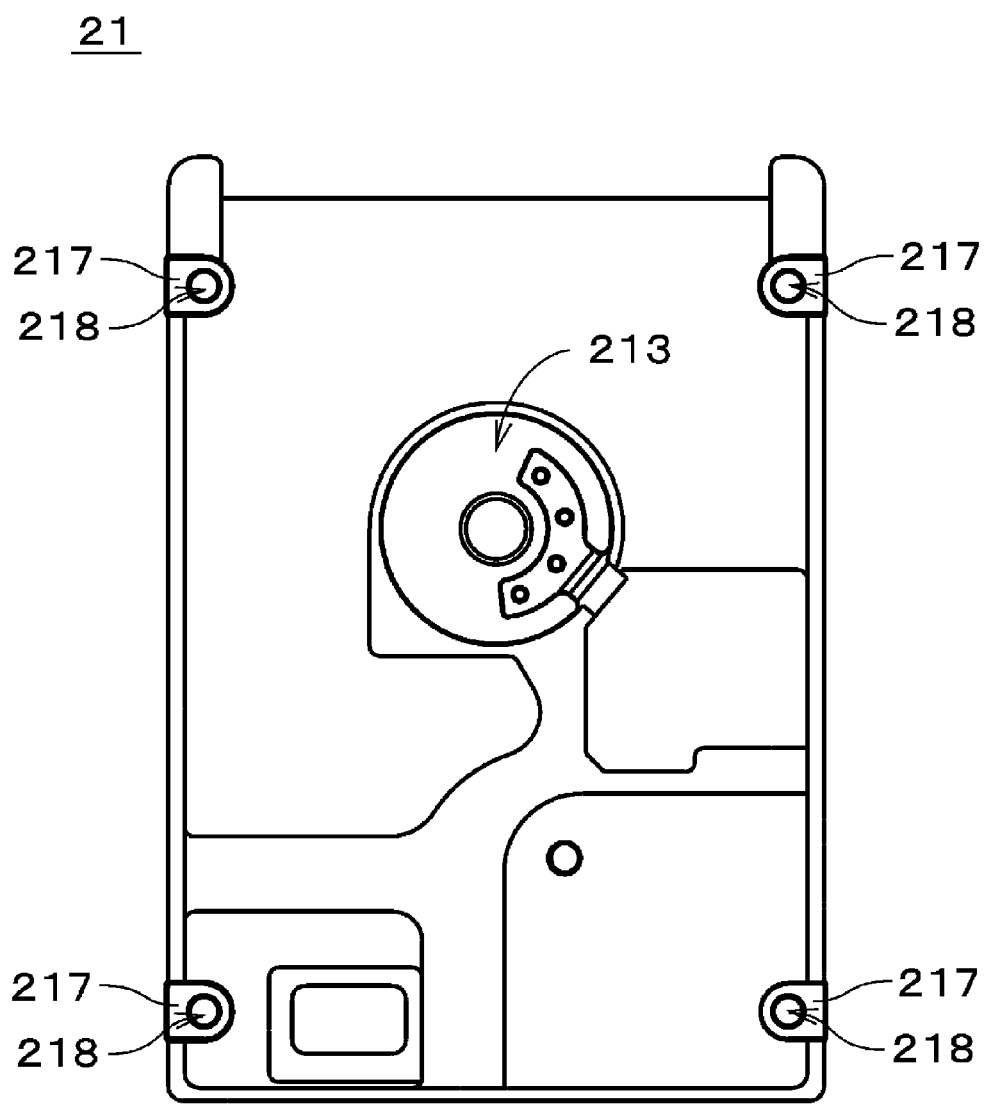
FIG. 14 is a bottom view showing yet another modified example of the base plate.
Figure 15:
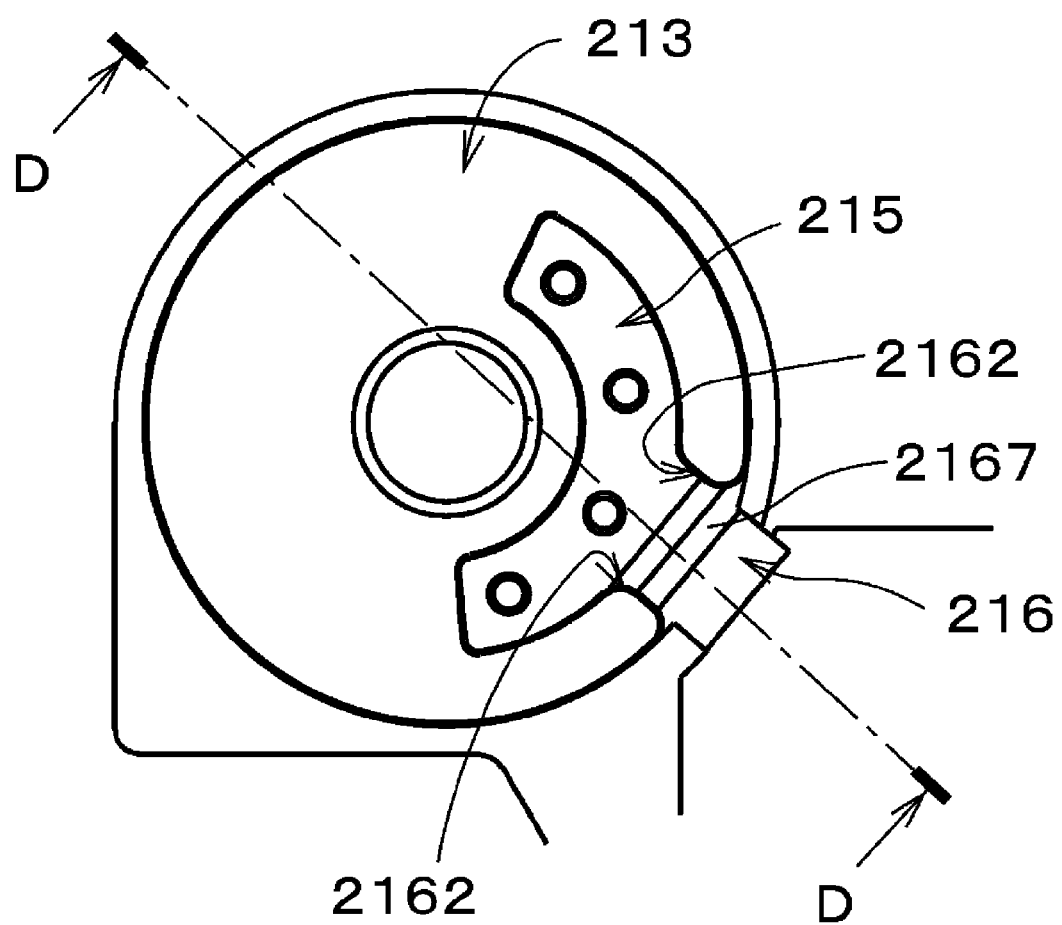
FIG. 15 is a diagram illustrating a central region.

FIG. 14 is a bottom view showing yet another modified example of the base plate 21. FIG. 15 is an enlarged view of the central region 213 of the base plate 21. The structure of the base plate 21 according to the present modified example is substantially similar to the structure of the base plate 21 illustrated in FIGS. 1 to 4 and 13. The base plate 21 according to the present modified example is different from the base plate 21 illustrated in FIG. 4 in that the side surfaces 2162 of the groove portion 216 preferably are parallel or substantially parallel with the central axis J1. The base plate 21 according to the present modified example is different from the base plate 21 illustrated in FIG. 13 in the shape of the protrusion portion 2167. In the other respects, the structure of the base plate 21 according to the present modified example is substantially similar to the structure of the base plate 21 illustrated in FIGS. 1 to 4 and 13. As with the structure illustrated in FIG. 13, the protrusion portion 2167 is preferably arranged to extend continuously from one of the side surfaces 2162 of the groove portion 216 to the other. Note, however, that the protrusion portion 2167 may not necessarily be arranged to extend continuously from one of the side surfaces 2162 to the other, as described above.

The lower surface of the base plate 21 has, at an outer edge portion thereof, attachment reference surfaces 217 used to attach the storage disk drive apparatus 60 to a predetermined location. The attachment reference surfaces 217 provided on the lower surface of the base plate 21 are preferably four in number, for example. The attachment reference surfaces 217 are arranged to face downwards. Each of the attachment reference surfaces 217 includes a screw hole 218 defined therein.

Figure 16:
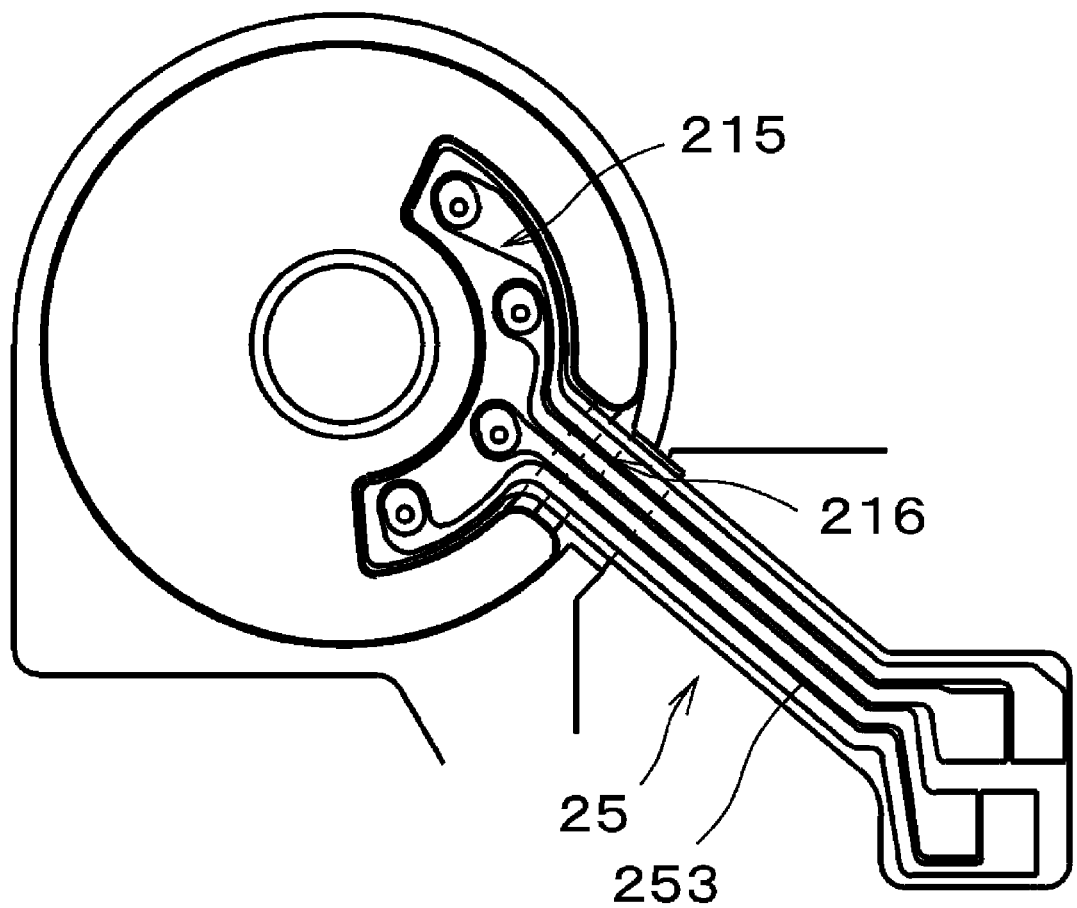
FIG. 16 is a diagram illustrating the central region and a flexible printed circuit board.
Figure 17:
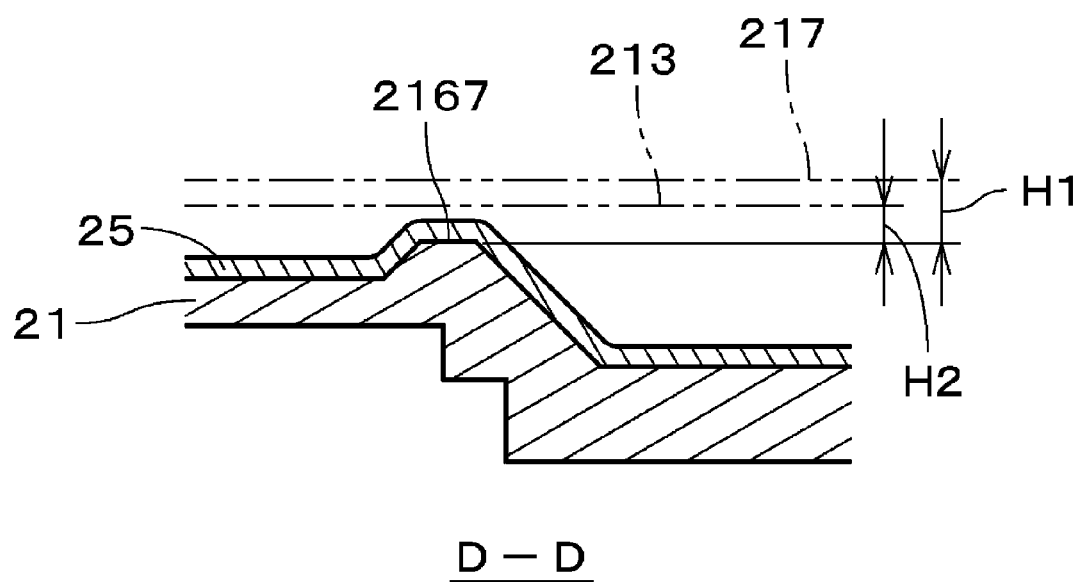
FIG. 17 is a partial section view of the base plate.

FIG. 16 illustrates a situation in which the flexible printed circuit board 25 has been attached to the recess portion 215 and the groove portion 216. Note that, unlike in FIG. 3, a resin layer 26 is not provided within the recess portion 215. FIG. 17 is a section view of the base plate 21 and the flexible printed circuit board 25 taken along line D-D in FIG. 15. The upper side of FIG. 17 corresponds to a lower side of the motor 1 in a direction parallel or substantially parallel to the central axis J1, i.e., the side on which the stator unit 2 is positioned in the motor 1. Therefore, the protrusion portion 2167 is arranged to protrude downwards The shape of a vertical cross-section of the protrusion portion 2167 taken along a direction parallel or substantially parallel to the direction of the extension of the groove portion 216, i.e., taken along line D-D in FIG. 15, preferably is a trapezoid or a substantial trapezoid, for example. Alternatively, as illustrated in FIG. 13, the shape of the vertical cross-section of the protrusion portion 2167 may include the shape of an arc or a substantial arc. When the vertical cross-section of the protrusion portion 2167 is in any of these shapes, smooth attachment of the flexible printed circuit board 25 (i.e., an example circuit board) along the protrusion portion 2167 is easily achieved. Moreover, this contributes to preventing the flexible printed circuit board 25 from being separated from the base plate 21, and/or preventing a gap from being formed between the flexible printed circuit board 25 and the base plate 21, thereby ensuring that an interior of the storage disk drive apparatus 60 can remain airtight. Furthermore, referring to FIG. 16, the protrusion portion 2167 is arranged to extend substantially perpendicularly to the direction of the extension of the extending portion 253 of the flexible printed circuit board 25. This contributes to preventing the extending portion 253 from deviating from its intended path in the circumferential direction when the extending portion 253 passes over the protrusion portion 2167.

In FIG. 17, the level of the attachment reference surfaces 217 and the level of the central region 213 are denoted by reference numerals "217" and "213", respectively. With respect to the direction parallel or substantially parallel to the central axis J1, the position of a top of the protrusion portion 2167 is preferably at a level lower, in FIG. 17, than that of the attachment reference surfaces 217 by the thickness of the flexible printed circuit board 25 or more. The lower side of FIG. 17 corresponds to the upper side of the motor 1 when the rotor unit 3 is positioned upwards. That is, it is preferable that a distance denoted by reference symbol "H1" in FIG. 17 be equal to or greater than the thickness of the flexible printed circuit board 25, to prevent a surface of the flexible printed circuit board 25 from being positioned at a level lower than that of the attachment reference surfaces 217. This contributes to preventing the flexible printed circuit board 25 from interfering with another component when the storage disk drive apparatus 60 is attached to the predetermined location.

More preferably, with respect to the direction parallel or substantially parallel to the central axis J1, the position of the top of the protrusion portion 2167 is at a level lower, in FIG. 17, than that of a bottom surface of the central region 213 by the thickness of the flexible printed circuit board 25 or more. The lower side of FIG. 17 corresponds to the upper side of the motor 1 when the rotor unit 3 is positioned upwards. A distance denoted by reference symbol "H2" in FIG. 17 is preferably equal to or greater than the thickness of the flexible printed circuit board 25. This contributes to preventing the surface of the flexible printed circuit board 25 from protruding over the central region 213 to interfere with another component. It also contributes to facilitating an operation of attaching a nameplate to the central region 213 so that the nameplate can be attached to the central region quickly and properly. Furthermore, the position of the top of the protrusion portion 2167 is preferably at a level lower than that of the bottom surface of the recess portion 215.

Figure 18:
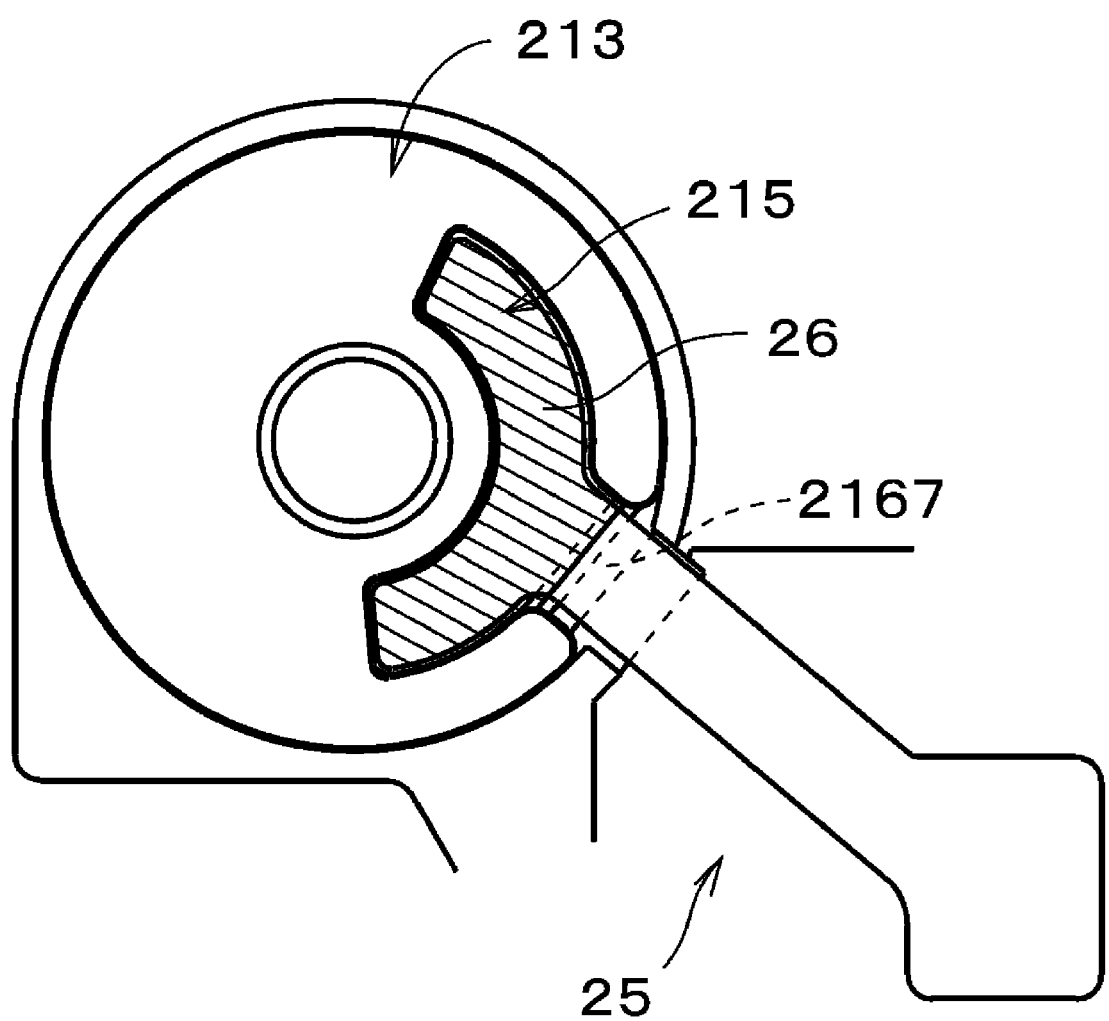
FIG. 18 is a diagram illustrating the central region and the flexible printed circuit board.
Figure 19:
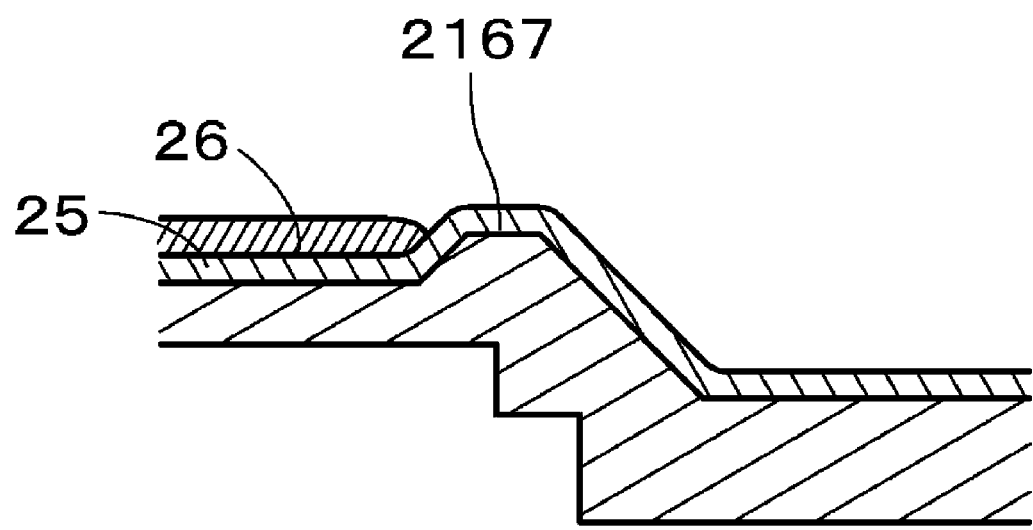
FIG. 19 is a partial section view of the base plate.

FIG. 18 is a bottom view showing the central region 213 when the flowable resin material is supplied to the recess portion 215 to form the resin layer 26. In FIG. 18, the resin layer 26 is indicated by hatched lines, and a wiring pattern of the flexible printed circuit board 25 is not shown. When the flowable resin material is applied on the recess portion 215, the protrusion portion 2167 blocks passage of the flowable resin material to prevent an overflow of the flowable resin material, with the result that the resin layer 26 is arranged to spread along the flexible printed circuit board 25 until it reaches the protrusion portion 2167 as illustrated in FIG. 19. The prevention of the overflow of the flowable resin material is effective when, as in the case of FIG. 13, the peripheral region 214 is positioned at a level higher (i.e., lower in FIG. 19) than that of the groove portion 216 with respect to the direction parallel or substantially parallel to the central axis J1. The flowable resin material is preferably a thermally curable adhesive agent. Naturally, as mentioned above, the flowable resin material may be an ultraviolet-curable adhesive agent, any of various types of coating agents, or the like. However, any other flowable resin material could be used if so desired.

In the case where the recess portion 215 and a portion of the groove portion 216 are covered with the flowable resin material, as in the case of FIG. 13, it is preferable that the protrusion portion 2167 be arranged to extend at least between each side surface of the extending portion 253 and both side surfaces 2162 of the groove portion 216. Then, a region within the recess portion 215 which covers at least connection points in the connection portion 252 and extends up to the boundary between the recess portion 215 and the groove portion 216 is covered with the cured flowable resin material.

The inclusion of the protrusion portion 2167 in the storage disk drive apparatus 60 contributes to improving the rigidity of the base plate 21. This in turn contributes to reducing a vibration of the storage disk drive apparatus 60, and improving impact resistance thereof. The base plate 21 provided with the protrusion portion 2167 is especially suitable for use in a storage disk drive apparatus with a thickness of about 7 mm, for example, which requires the base plate 21 to be thin.

Note that features of the structures as illustrated in FIGS. 1 to 13 and those of the modified examples thereof as described above with reference to FIGS. 1 to 13 may be applied to the present modified example illustrated in FIGS. 14 to 19 insofar as no contradiction is incurred. For instance, the central region 213 may not necessarily be positioned at a level lower than that of the peripheral region 214.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A spindle motor for use with a storage disk drive apparatus, the spindle motor comprising:
    a stator unit; and
    a rotor unit supported to be rotatable about a central axis with respect to the stator unit; wherein
    the stator unit includes:
        a stator arranged around the central axis;
        a base portion including a through hole passing therethrough in a direction parallel or substantially parallel to the central axis, and arranged on a lower side of the rotor unit in the direction parallel or substantially parallel to the central axis; and
        a circuit board attached to a lower surface of the base portion, and including a connection portion to which a conductive wire from the stator is connected after passing through the through hole, and a strip-shaped extending portion arranged to extend from the connection portion;
    the lower surface of the base portion includes:
        a recess portion arranged to accommodate the connection portion of the circuit board; and
        a groove portion arranged to extend from the recess portion to have the extending portion arranged therein; and
        at least a portion of a bottom surface of the groove portion defines a protrusion portion arranged to protrude downwards;
    the strip-shaped extending portion is arranged to extend over the protrusion portion;
    the lower surface of the base portion further includes:
        a central region concentric with the central axis; and
        a peripheral region arranged radially outward of the central region and a position of the peripheral region with respect to the direction parallel or substantially parallel to the central axis being at a level higher than that of the central region;
    the recess portion and the groove portion are arranged within the central region.

2. The spindle motor according to claim 1, wherein the protrusion portion is arranged to extend continuously from one side surface of the groove portion to the other.

3. The spindle motor according to claim 2, wherein a shape of a vertical cross-section of the protrusion portion taken along a direction parallel or substantially parallel to a direction of an extension of the groove portion includes a trapezoidal shape, a substantially trapezoidal shape, an arc shape, or a substantial arc shape.

4. The spindle motor according to claim 1, wherein
    the base portion includes an attachment reference surface arranged to face downwards; and
    with respect to the direction parallel or substantially parallel to the central axis, a position of a tip of the protrusion portion is at a level higher than that of the attachment reference surface by a distance equal to a thickness of the circuit board or more.

5. The spindle motor according to claim 1, wherein
    with respect to the direction parallel or substantially parallel to the central axis, a position of a tip of the protrusion portion is at a level higher than that of a bottom surface of the central region by a distance equal to a thickness of the circuit board or more.

6. The spindle motor according to claim 1, wherein
    the protrusion portion is arranged to extend at least between each side surface of the extending portion and both side surfaces of the groove portion; and
    a region within the recess portion which covers at least a connection point in the connection portion and extends up to a boundary between the recess portion and the groove portion is covered with a cured flowable resin material.

7. The spindle motor according to claim 6, wherein the flowable resin material is arranged to reach the protrusion portion.

8. The spindle motor according to claim 6, wherein the flowable resin material includes a thermally curable adhesive agent.

9. A storage disk drive apparatus comprising:
- the spindle motor of claim 1 arranged to rotate a storage disk used for information storage;
- an access unit arranged to read or write information from or to the storage disk; and
- a housing arranged to contain the spindle motor and the access unit.

10. The storage disk drive apparatus according to claim 9, wherein the storage disk drive apparatus has a thickness of about 7 mm.

11. The spindle motor according to claim 1, wherein the protrusion portion defined in the at least a portion of the bottom surface of the groove portion is arranged to protrude downward from the recess portion.

12. The spindle motor according to claim 1, wherein a position of a tip of the protrusion portion is at a level lower than the recess portion with respect to the direction parallel or substantially parallel to the central axis.

* * * * *